(12) United States Patent
Rink et al.

(10) Patent No.: US 7,067,584 B2
(45) Date of Patent: Jun. 27, 2006

(54) SOLVENT-CONTAINING COATING MATERIAL AND THE USE THEREOF

(75) Inventors: Heinz-Peter Rink, Münster (DE); Ines Mangels, Münster (DE); Dunja Mikolajetz, Münster (DE); Margret Möllmann, Münster (DE)

(73) Assignee: BASF Coatings AG, Munster (DE)

( * ) Notice: Subject to any disclaimer, the term of this patent is extended or adjusted under 35 U.S.C. 154(b) by 252 days.

(21) Appl. No.: 10/623,218

(22) Filed: Jul. 18, 2003

(65) Prior Publication Data

US 2004/0019142 A1    Jan. 29, 2004

Related U.S. Application Data

(63) Continuation of application No. 10/049,607, filed as application No. PCT/EP00/08033 on Aug. 17, 2000, now abandoned.

(30) Foreign Application Priority Data

Aug. 27, 1999   (DE)   ................. 199 40 855

(51) Int. Cl.
    C08L 67/02    (2006.01)
(52) U.S. Cl. ................. 525/166; 525/191; 525/216
(58) Field of Classification Search ............ 525/166, 525/191, 216
    See application file for complete search history.

(56) References Cited

U.S. PATENT DOCUMENTS

| | | | |
|---|---|---|---|
| 3,547,848 A | 12/1970 | Marsh et al. ................. | 260/22 |
| 4,246,382 A | 1/1981 | Honda et al. ................. | 526/79 |
| 4,311,622 A | 1/1982 | Buter ..................... | 260/18 EP |
| 4,383,068 A | 5/1983 | Brandt ..................... | 524/196 |
| 4,710,542 A | 12/1987 | Forgione et al. ............ | 525/127 |
| 4,754,014 A | 6/1988 | Ryntz et al. ................. | 528/28 |
| 4,895,910 A | 1/1990 | Isozaki et al. ........... | 525/326.5 |
| 4,939,213 A | 7/1990 | Jacobs, III et al. ....... | 525/329.9 |
| 5,028,639 A | 7/1991 | Treutlein et al. ............ | 523/200 |
| 5,079,312 A | 1/1992 | Isozaki et al. ............ | 525/479 |
| 5,084,541 A | 1/1992 | Jacobs, III et al. ........... | 528/45 |
| 5,447,998 A | 9/1995 | Grady et al. ................. | 526/65 |
| 5,576,386 A | 11/1996 | Kempter et al. ............. | 526/88 |
| 5,608,012 A | 3/1997 | Epple et al. ................. | 525/374 |
| 5,690,569 A | 11/1997 | Ledvina et al. ............. | 474/111 |
| 5,759,631 A | 6/1998 | Rink et al. .............. | 427/407.1 |
| 5,969,054 A | 10/1999 | Wamprecht et al. ........ | 525/392 |
| 5,977,246 A | 11/1999 | Fenn ..................... | 524/590 |
| 6,274,660 B1 | 8/2001 | Zeller et al. ................ | 524/379 |
| 6,309,707 B1 | 10/2001 | Mayer et al. ............... | 427/386 |
| 6,376,596 B1 | 4/2002 | Barsotti et al. ............. | 524/500 |
| 6,433,097 B1 * | 8/2002 | Nixon et al. ................ | 525/273 |
| 6,462,144 B1 | 10/2002 | Ramesh et al. ............. | 525/438 |
| 6,515,192 B1 | 2/2003 | Rink et al. .................... | 585/16 |

FOREIGN PATENT DOCUMENTS

| | | |
|---|---|---|
| DE | 1 805 693 | 10/1968 |
| DE | 2 359 923 | 6/1974 |
| DE | 27 51 761 A1 | 6/1978 |
| DE | 28 48 906 A1 | 5/1979 |
| DE | 37 06 095 A1 | 8/1987 |
| DE | 36 36 183 A1 | 3/1988 |
| DE | 38 07 571 A1 | 9/1988 |
| DE | 44 07 415 A1 | 9/1995 |
| DE | 44 21 823 A1 | 1/1996 |
| DE | 195 24 182 A1 | 1/1997 |
| DE | 196 00 136 A1 | 7/1997 |
| DE | 197 09 476 A1 | 11/1997 |
| DE | 198 05 421 C1 | 6/1999 |
| EP | 0 038 127 A1 | 3/1981 |
| EP | 0 192 304 B1 | 2/1986 |
| EP | 0 245 700 A2 | 4/1987 |
| EP | 0 249 201 A3 | 6/1987 |
| EP | 0 276 501 A2 | 9/1987 |
| EP | 0 358 153 B1 | 9/1989 |
| EP | 0 502 839 | 3/1992 |
| EP | 0 531 249 A1 | 9/1992 |
| EP | 0 554 783 A1 | 1/1993 |
| EP | 0 624 577 A1 | 5/1994 |
| WO | WO82/02387 | 7/1982 |
| WO | WO95/27742 | 10/1992 |
| WO | WO92/22615 | 12/1992 |
| WO | WO93/17060 | 9/1993 |
| WO | WO94/22968 | 10/1994 |
| WO | WO96/12754 | 5/1996 |
| WO | WO96/20968 | 7/1996 |
| WO | WO97/12945 | 4/1997 |

(Continued)

OTHER PUBLICATIONS

English Abstract DE19600136.
English Abstract for DE19600136.
BASF Corp. et al., PCT/EP99/06042, Aug. 18, 1999, entitled: Hyperbranched compounds with a tertrafunctional central group and use of same, pp. 1-56 and abstract on 2 pages.

(Continued)

Primary Examiner—Jeffrey B. Robertson

(57) ABSTRACT

Method for making a solvent-containing coating material comprising 5 to 70% by weight of at least one mixture of substances (A). The mixture of substances is obtained by copolymerizing in at least one hydroxy-group containing reactive diluent a mixture (A1) of olefinically unsaturated monomers that contain a1) 1 to 90% by weight, based on mixture (A1), of at least one cycloaliphatic monomer and a2) 0 to 90% by weight, based on mixture (A1), of at least one hydroxy-group containing monomer. The coating material further contains 5 to 70% by weight of at least one hydroxy-group containing polyaddition resin (polyadduct) (B) with a $M_n$ of 800 to 3,500 and 5 to 70% by weight of at least one cross-linking agent (C) for thermally cross-linking the material. The weight of A, B, and C are based on the solid content of the coating material.

11 Claims, No Drawings

FOREIGN PATENT DOCUMENTS

WO  WO 00/014049  3/2000
WO  WO00/18516  4/2000

OTHER PUBLICATIONS

English Abstract for DE196 00 136 A1.
English Abstract on cover page of International Publication No. WO 00/14049.
English Abstract on cover page of International Publication No. WO 92/22615.
English Abstract on cover page of International Publication No. WO 94/22968.
English Abstract on front page of the International Publication for WO00/18516.
BASF Coatings AG, et al., U.S. Appl. No. 09/470,405 filed Dec. 22, 1999.
BASF Coatings AG, et al., U.S. Appl. No. 09/952,732 filed Sep. 14, 2001.
BASF Coatings AG, et al., U.S. Appl. No. 10/040,819 filed Jan. 7, 2002.
BASF Coatings AG, et al., U.S. Appl. No. 10/106,000 filed Mar. 25, 2002.
Axel R. Brenner, et al., entitled "Hyperbranched Polymers: modification with flex Chains", (1995), pp. 176-177.

* cited by examiner

SOLVENT-CONTAINING COATING MATERIAL AND THE USE THEREOF

CROSS REFERENCE TO RELATED APPLICATIONS

The present application is a continuation of Ser. No. 10/049,607, filed Feb. 14, 2002 now abandoned, which is a 371 of PCT/EP00/08033, filed Aug. 17, 2000, which claims priority to DE 199 40 855.6, filed Aug. 27, 1999, all of which are incorporated herein by reference.

BACKGROUND OF THE INVENTION

The present invention relates to a novel solventborne coating material. The present invention further relates to the use of the novel solventborne coating material in automotive OEM finishing and refinish, in industrial coating, including coil coating, container coating and the coating of electrical components, in the coating of plastics, and in furniture coating. The present invention further relates to the use of the novel solventborne coating material for producing novel single-coat or multicoat clear or color and/or effect coating systems. The present invention relates not least to motor vehicle bodies, industrial components and finished products, including coils, containers and electrical components, polymer moldings, and furniture, which have at least one of these novel coating systems.

Coating materials referred to as conventional, i.e., coating materials containing solvent, continue to be indispensable for many end uses despite every attempt to replace them by solvent-free counterparts. For reasons of environmental protection and safety-related expenditure, however, manufacturers and users of solventborne coating materials are concerned to reduce further the solvent fraction of the coating materials, i.e., to achieve high solids contents. By those in the art, such coating materials with a high solids content are also referred to as "high-solids paints".

The formulation of high-solids paints is particularly difficult for the technologically significant two-component paints which, as is known, are crosslinked using polyisocyanates. Thus high solids contents lead to an undesirably high coating material viscosity, which hinders spray application if not, indeed, preventing it entirely. Where, on the other hand, only constituents of low molecular mass, and thus of low viscosity, are used, the resulting coatings generally have an inadequate profile of properties. In general, the high solids content reduces the pot life of such coating materials to an unwanted extent.

It has proven possible to remedy the situation to a certain extent through the use of reactive diluents. A reactive diluent is a reactive diluting media or solvent which as defined in accordance with DIN 55945: 1996-09 becomes part of the binder by chemical reaction during film formation. When customary and known reactive diluents are used, for example, in coating materials, however, additional problems may occur, such as the partial dissolution of further coats on application or a lowering of the heat stability and the light stability. In addition, adding reactive diluents to the coating materials is an additional process step, which is fundamentally disadvantageous in the context of process economy.

There has been no lack of attempts to formulate high-solids paints which were to meet the continually growing technological requirements.

For instance, the European patent EP-A-0 638 591 discloses hydroxyl-containing copolymers having a particularly low viscosity which are obtainable by radical copolymerization of mixtures of olefinically unsaturated monomers that contain cycloaliphatic monomers. The hydroxyl groups in the copolymers are, sterically speaking, not very accessible, with the consequence that, although the two-component paints in question do have a longer processing capacity, this is obtained at the expense of a slowing of the crosslinking reaction.

The European patent EP-A-0 819 710 describes coating materials, especially two-component paints, based on graft copolymers and polyisocyanates. The graft copolymers in turn are based on functionalized polyolefins and monoepoxides, and are prepared preferably at high temperatures (150 to 220° C.). The coating materials, however, give coating systems whose gloss, acid resistance, scratch resistance, and leveling leave something to be desired.

The international patent application WO 97/30099 describes high-solids paints comprising aldimines and/or ketamines as reactive diluents and polyesters containing secondary hydroxyl groups as binders. These coating materials do give good coating systems, but the processing times and baking conditions must be observed very strictly.

Furthermore, the international patent application WO 96/20968 describes high-solids paints hydroxy-functional copolymers and oligoesters which are preparable by reacting at least one branched polycarboxylic acid with at least one monoepoxy ester and/or by reacting a polyol with a carboxylic anhydride and reacting the resultant intermediate with an epoxide. The coating systems produced with these known coating materials also require further improvement in respect of their gloss, acid resistance, scratch resistance, and leveling.

SUMMARY OF THE INVENTION

The present invention was based on the object of finding novel solventborne coating materials which no longer have the disadvantages of the prior art but which instead combine a high solids content with low viscosity, a pot life appropriate to all end uses, a high level of processing reliability and stability, and also antipopping reliability. The novel coatings produced therewith, especially the novel single-coat and multicoat clear or color and/or effect coating systems, are to have a balanced, very good profile of properties and are to satisfy all of the market requirements in terms of their gloss, acid resistance, scratch resistance, and leveling. Furthermore, the novel clearcoats are to adhere very well to basecoats produced from aqueous basecoat materials, and are to have very good reflow characteristics.

The invention accordingly provides the novel solventborne coating material which comprises the following constituents:

from 5 to 70% by weight, based on the solids content of the coating material, of at least one composition preparable by copolymerizing A1) a mixture of olefinically unsaturated monomers containing a1) from 1 to 90% by weight, based on the mixture (A1), of at least one cycloaliphatic monomer and a2) from 0 to 90% by weight, based on the mixture (A1), of at least one hydroxyl-containing monomer, the amounts of the olefinically unsaturated monomers adding up to 100% by weight, in at least one hydroxyl-containing reactive diluent;

from 5 to 70% by weight, based on the solids content of the coating material, of at least one hydroxyl-containing polyaddition resin (polyadduct) with a number-average molecular weight Mn of from 800 to 3500 and a viscosity (measured on an 80% strength solution in butyl acetate) of <80 dPas, and from 5 to 70% by weight, based on the solids content of the coating material, of at least one thermal crosslinking agent;

the amounts of the constituents (A), (B) and (C) adding up to 100% by weight.

In the text below, the novel solventborne coating material is referred to as "inventive coating material".

The invention also provides the novel single-coat and multicoat clear or color and/or effect coating systems which are obtainable using the inventive coating materials and which are referred to below collectively as "inventive coating systems".

The invention provides not least the novel motor vehicle bodies, industrial components and finished products, including coils, containers and electrical components, polymer moldings and furniture which have at least one inventive coating system referred to collectively below as "inventive substrates".

DETAILED DESCRIPTION

In the light of the prior art it was surprising and unforeseeable for the skilled worker that the object on which the present invention was based could be achieved by means of the inventive coating material. A particular surprise was that the inventive coating material, even at a solids content of more than 70% by weight, was still very suitable for spray application and even had a pot life of more than two hours. Another surprise was that the inventive clearcoat, in multicoat color and/or effect coating systems produced by the advantageous wet-on-wet technique, adhered outstandingly to the basecoats produced from aqueous basecoat materials, and had very good reflow characteristics.

The inventive coating material is a one-component system or a two-multicomponent system.

In the context of the present invention, a one-component system is a coating material in which the binder and the crosslinking agent are present alongside one another, i.e. in one component. A prerequisite for this is that the two constituents crosslink with one another only at relatively high temperatures and/or on exposure to actinic radiation.

In the context of the present invention, a two-component or multicomponent system is a coating material in which in particular the binder and the crosslinking agent are present separately from one another in at least two components which are not combined until shortly before application. This form is chosen when binder and crosslinking agent react with one another even at room temperature. Coating materials of this kind are employed in particular for coating thermally sensitive substrates, particularly in automotive refinish.

Preferably, with the inventive coating material is a two-component system.

Depending on pigmentation, the inventive coating material is used for producing transparent clearcoats and/or for producing color and/or effect basecoats. With particular preference it is employed for producing clearcoats, especially as part of the wet-on-wet technique or in automotive refinish.

The inventive coating material is thermosetting or is cured thermally and with actinic radiation (dual cure). In the latter case, the inventive coating material comprises customary and known constituents which can be crosslinked with actinic radiation.

Actinic radiation is electromagnetic radiation such as near infrared (NIR), visible light or UV light, but especially UV light, and also corpuscular radiation such as electron beams.

The first essential constituent of the inventive coating material is the composition (A).

The composition (A) is solid or liquid. Preferably, it is liquid at room temperature. It is present in the inventive coating material in an amount of from 5 to 70%, preferably from 10 to 65%, more preferably from 12 to 60%, with particular preference from 15 to 55%, and in particular from 20 to 50% by weight, based in each case on the solids content of the coating material.

The composition (A) is preparable by copolymerizing a mixture (A1) of olefinically unsaturated monomers (a) in at least one hydroxyl-containing reactive diluent.

The mixture (A1) contains, based in each case on the mixture, from 1 to 90, preferably from 2 to 80%, more preferably from 3 to 70%, with particular preference from 4 to 60%, and in particular from 5 to 50% by weight of at least one cycloaliphatic monomer (a1).

The cycloaliphatic monomer (a1) is hydroxyl-containing with at least one hydroxyl group per molecule or free from hydroxyl groups. The cycloaliphatic monomers (a1) may come from any classes of monomer provided they contain a cycloaliphatic structural unit. Examples of suitable monomer classes are cycloaliphatic esters or amides or ethylenically unsaturated carboxylic acids, especially acrylic acid, methacrylic acid, ethacrylic acid or crotonic acid; and also cycloaliphatic vinyl esters, vinyl ethers, N-vinyl amides, allyl esters, allyl ethers or cycloolefins such as cyclohexene, cyclopentene, norbornene, cyclopentadiene and/or dicyclopentadiene. Of these, the cycloaliphatic esters and amides of alpha, beta-ethylenically unsaturated carboxylic acids are particularly advantageous and are therefore used with preference. Examples of especially advantageous monomers (a1) of this kind are cyclohexyl, isobornyl, dicyclopentadienyl, octahydro-4,7-methano-1H-indenemethanol or tert-butylcyclohexyl acrylate, methacrylate, ethacrylate or crotonate or 1,4-bis(hydroxymethyl)cyclohexane, octahydro-4,7-methano-1H-indenedimethanol monoacrylate, monomethacrylate, monoethacrylate and/or monocrotonate; N-cyclohexyl- or N,N-cyclohexyl-methylamides of acrylic acid, methacrylic acid, ethacrylic acid or crotonic acid. It is further possible to use higher polyfunctional cycloaliphatic monomers (a1) such as 1,4-bis(hydroxymethyl)cyclohexane, octahydro-4,7-methano-1H-indenedimethanol diacrylate, dimethacrylate, diethacrylate and/or dicrotonate in minor amounts. In the context of the present invention, minor amounts of higher polyfunctional monomers are amounts which do not lead to crosslinking or gelling of the resulting copolymers.

Additionally to the hydroxyl-containing cycloaliphatic monomers (a1), the mixture (A1), based in each case on the mixture, can contain up to 90%, preferably up to 80%, more preferably up to 70%, with particular preference up to 60%, and in particular up to 50% by weight of another hydroxyl-containing monomer (a2) containing at least one hydroxyl group per molecule. The hydroxyl-containing monomers (a2) come from the abovementioned monomer classes. Examples of especially suitable hydroxyl-containing monomers (a2) are hydroxyalkyl esters of acrylic acid, methacrylic acid or another alpha,beta-ethylenically unsaturated carboxylic acid which derive from an alkylene glycol which is esterified with the acid, or are obtainable by reacting the acid with an alkylene oxide, especially hydroxyalkyl esters of acrylic acid, methacrylic acid, ethacrylic acid or crotonic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; or methylpropanediol monoacrylate, monomethacrylate, monoethacrylate, monocrotonate, monomaleate, monofumarate or monoitaconate; or reaction products of cyclic esters, such as epsilon-caprolactone, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. These higher polyfunctional monomers (a2) are employed in minor amounts. In the context of the present invention, minor amounts of higher polyfunctional monomers are amounts which do not lead to crosslinking or gelling of the resulting copolymers. Where used, the fraction of trimethylolpropane monoallyl ether is from 2 to 10% by weight, based on the overall weight of the monomers (a) used for preparing the copolymer. In addition, however, it is also possible to add from 2 to 10% by weight, based on the overall weight of the monomers (a) used to prepare the copolymers, of trimethylolpropane monoallyl ether to the finished copolymer. The olefinically unsaturated polyols, such as trimethylolpropane monoallyl ether in particular, may be used as sole hydroxyl-containing monomers (a2) or else, in particular, proportionally in combination with others of the hydroxyl-containing monomers (a2) mentioned.

Furthermore, the mixture (A1) can comprise other monomers (a) which are copolymerizable with the above-described monomers (a1) and (a2).

Examples of suitable further copolymerizable monomers (a) are:

Monomers (a3):

(Meth)acrylic acid alkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; (meth)acrylic acid oxaalkyl esters or oxacycloalkyl esters such as ethyl triglycol (meth)acrylate and methoxyoligoglycol(meth)acrylate having a molecular weight Mn of preferably 550; or other ethoxylated and/or propoxylated, hydroxyl-free (meth)acrylic acid derivatives. These may contain minor amounts of higher polyfunctional (meth)acrylic acid alkyl or cycloalkyl esters such as ethylene glycol, propylene glycol, diethylene glycol, dipropylene glycol, butylene glycol, pentane-1,5-diol or hexane-1,6-diol di(meth)acrylate; trimethylolpropane di- or tri(meth)acrylate; or pentaerythritol di-, tri- or tetra(meth)acrylate. In the context of the present invention, minor amounts of higher polyfunctional monomers are amounts which do not lead to crosslinking or gelling of the polyacrylate resins.

Monomers (a4):

Monomers containing at least one acid group, preferably one carboxyl group, per molecule, especially acrylic acid and/or methacrylic acid. It is, however, also possible to use other ethylenically unsaturated carboxylic acids having up to 6 carbon atoms in the molecule.

Examples of such acids are ethacrylic acid, crotonic acid, maleic acid, fumaric acid and itaconic acid. It is also possible to use ethylenically unsaturated sulfonic or phosphonic acids, and/or their partial esters, as monomers (a4). Further suitable monomers (a4) include mono(meth)acryloyloxy ethyl maleate, succinate and phthalate.

Monomers (a5):

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may contain both branched and straight-chain acyclic and/or cycloaliphatic olefins. The reaction of such olefins with formic acid and/or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be obtained from the acids in a manner known per se, by for example reacting the acid with acetylene. Particular preference—owing to their ready availability—is given to the use of vinyl esters of saturated aliphatic monocarboxylic acids of from 9 to 11 carbon atoms which are branched on the alpha carbon atom. Examples of very particularly preferred vinyl esters are the vinyl esters of Versatic® acids, which are sold under the brand name VeoVa® by Deutsche Shell Chemie. For further details, refer to Römpp Lexikon Lacke und Druckfarben, Georg Thieme Verlag, Stuttgart, N.Y., 1998, page 598 and also pages 605 and 606.

Monomers (a6):

Reaction products of acrylic acid and/or methacrylic acid with the glycidyl ester of an alpha-branched monocarboxylic acid having 5 to 18 carbon atoms per molecule used. Glycidyl esters of highly branched monocarboxylic acids are available under the trade name Cardura®. The reaction of the acrylic or methacrylic acid with the glycidyl ester of a carboxylic acid having a tertiary alpha carbon atom may take place before, during or after the copolymerization reaction. As monomer (a6) it is preferred to use the reaction product of acrylic and/or methacrylic acid with the glycidyl ester of Versatic® acid. This glycidyl ester is available commercially under the name Cardura® E10. For further details, refer to Römpp Lexikon Lacke und Druckfarben, Georg Thieme Verlag, Stuttgart, N.Y., 1998, pages 605 and 606.

Monomers (a7):
- olefins such as ethylene, propylene, but-1-ene, pent-1-ene, hex-1-ene, butadiene and/or isoprene;
- (meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-(meth)acrylamide;
- monomers containing epoxide groups, such as the glycidyl ester of acrylic acid, methacrylic acid, ethacrylic acid, crotonic acid, maleic acid, fumaric acid and/or itaconic acid;
- vinylaromatic hydrocarbons, such as styrene, alpha-alkyl-styrenes, especially alpha-methylstyrene, alpha-aryl-styrenes, especially 1,1-diphenylethylene, and/or vinyl-toluene;
- nitriles such as acrylonitrile and/or methacrylonitrile;
- vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate and/or the vinyl ester of 2-methyl-2-ethylheptanoic acid; and/or
- polysiloxane macromonomers which have a number-average molecular weight Mn of from 1 000 to 40 000, preferably from 2 000 to 20 000, with particular preference from 2 500 to 10 000, and in particular from 3

000 to 7 000, and which contain on average 0.5 to 2.5, preferably from 0.5 to 1.5, ethylenically unsaturated double bonds per molecule, as are described in DE-A-38 07 571 on pages 5 to 7, in DE-A 37 06 095 in columns 3 to 7, in EP-B-0 358 153 on pages 3 to 6, in U.S. Pat. No. 4,754,014 in columns 5 to 9, in DE-A 44 21 823 or in the international patent application WO 92/22615 on page 12, line 18 to page 18, line 10, or acryloxysilane-containing vinyl monomers, preparable by reacting hydroxy-functional silanes with epichlorohydrin and then reacting the reaction product with methacrylic acid and/or hydroxyalkyl esters of (meth) acrylic acid.

Of the monomers (a7) it is preferred to use vinylaromatic hydrocarbons, especially styrene, in an amount of less than 15% by weight, based on the mixture (A1).

In accordance with the invention it is especially advantageous to select the monomers so as to give hydroxyl-containing copolymers which have an OHN of preferably from 100 to 250, more preferably from 130 to 210, acid numbers of preferably from 0 to 80, more preferably from 0 to 50, with very particular preference from 0 to 15, glass transition temperatures Tg of preferably from −25 to +80° C., more preferably from −20 to +40° C., and number-average molecular weights of preferably from 1 500 to 30 000, more preferably from 1 500 to 15 000, with very particular preference from 1 500 to 5 000 (determined by gel permeation chromatography with polystyrene as internal standard). Very particular advantages result from selecting the monomers so that polyacrylate copolymer resins result.

The glass transition temperature Tg of the copolymers is determined by the nature and amount of the monomers (a1) and, where appropriate, (a2) and also, where appropriate, (a3), (a4), (a5), (a6) and/or (a7) used. The selection of the monomers may be made by the skilled worker with the aid of the following Fox formula, by means of which the glass transition temperatures Tg of copolymers, especially polyacrylate resins, may be approximately calculated:

$$1/Tg = \sum_{n=1}^{n=x} W_n/Tg_n; \quad \sum_n W_n = 1$$

Tg=glass transition temperature of the polyacrylate resin
$W_n$=weight fraction of the nth monomer
$Tg_n$=glass transition temperature of the homopolymer of the nth monomer
x=number of different monomers Measures to control the molecular weight (e.g., selection of corresponding polymerization initiators, use of chain transfer agents, etc.) are part of the art knowledge of the average skilled worker and need not be elucidated further here.

For the present invention it is essential that the above-described monomers are (co)polymerized in at least one reactive diluent for thermally curable reactive coating materials.

In accordance with the invention, suitable reactive diluents as the reaction medium are all those which, during the known crosslinking reactions which take place in the corresponding inventive coating materials, are incorporated into the binder and which do not hinder, let alone prevent, the copolymerization of the monomers. The skilled worker will therefore be able to select the reactive diluents that are suitable in each case with the aid of his or her general knowledge in the art, where appropriate with the assistance of simple preliminary tests.

In accordance with the invention, advantageous reactive diluents are those which participate in the crosslinking of hydroxyl-containing compounds with compounds which carry functional groups that are reactive toward hydroxyl groups.

Accordingly, the reactive diluents which are particularly preferred in accordance with the invention contain hydroxyl groups.

Examples of reactive diluents particularly preferred in accordance with the invention are hyperbranched compounds containing a tetrafunctional central group derived from ditrimethylolpropane, diglycerol and/or ditrimethylolethane or a tetrafunctional central group of the general formula I

$$C[-A_q-X-]_m[-A_r-X-]_n[-A_s-X-]_o[-A_t-X-]_p \quad (I),$$

in which the indices and variables have the following definitions:
m+n+o+p=4; where
m is an integer from 1 to 3, and
n, o and p are 0 or an integer from 1 to 3;
q, r, s and t are an integer from 1 to 5, where q≧r, s, t, especially q>r, s, t;
X is —O—, —S— or —NH—;
A is —CR$_2$—; where
R is —H, —F, —Cl, —Br, —CN, —NO$_2$, C$_1$–C$_3$ alkyl or haloalkyl or C$_1$–C$_3$ alkoxy radical or, if q, r, s and/or t are at least 2, R is a C$_2$–C$_4$ alkanediyl and/or oxaalkanediyl radical having 2 to 5 carbon atoms and/or an oxygen atom —O— which bridges from 3 to 5 carbon atoms of the radical —A—.

The term "derived" relates in this case to the imaginary abstraction of the hydrogen atoms from the hydroxyl groups of the tetraols.

In accordance with the invention, the central groups I are of advantage and are therefore used with particular preference.

In the general formula I the indices q, r, s and t denote integers from 1 to 5. In this case the index q may be equal to the indices r, s and t. In that case the resulting central groups I are symmetrical.

Examples of suitable symmetrical central groups I for use in accordance with the invention are derived from symmetrical tetraols such as pentaerythritol, tetrakis(2-hydroxyethyl)methane or tetrakis(3-hydroxypropyl)methane.

In accordance with the invention, central groups I in which the index q is greater than the indices r, s and t and therefore has a value of at least 2 are of advantage and are therefore used with very particular preference. In that case, the resulting central groups I are asymmetric.

In the general formula I the indices m, n, o and p then add up to 4. The index m is always greater than 0 and represents an integer from 1 to 3, especially 1.

Subject to the above condition, the indices n, o and p have the value 0 or represent an integer from 1 to 3. This means that it is not possible for each of these indices to adopt the value 0.

In accordance with the invention, the following value combinations of the indices are of advantage:
m=1 and n, o, p=1;
m=1, n=2, o, p=1;
m=1, n=2, o=1 and p=0;
m=1, n=3, o, p=0;
m=2, n=1, o=1 and p=0;

m=2, n=2 and o, p=0;

m=3, n=1 and o, p=0.

Of these numerical combinations, those in which m=1 are particularly advantageous.

In accordance with the invention, the following numerical combinations of the indices are of advantage:

q=2, r, s and/or t=1;

q=3, r, s and/or t=1 and/or 2;

q=4, r, s and/or t=1, 2 and/or 3;

q=5, r, s and/or t=1, 2, 3 and/or 4.

The variable —X— in the general formula I denotes divalent oxygen atoms —O— or sulfur atoms —S— or a secondary amino group —NH—. In accordance with the invention it is advantageous for —X— to be —O—.

The variable —A—in the formula I denotes a divalent radical —CR$_2$—.

The radical R therein represents hydrogen atoms —H, fluorine atoms —F, chlorine atoms —Cl, bromine atoms —Br, nitrile groups —CN, nitro groups —NO$_2$, or C$_1$–C$_3$ alkyl or haloalkyl or C$_1$–C$_3$ alkoxy groups. Examples of suitable groups of this kind are methyl, ethyl, propyl, trifluoromethyl, trichloromethyl, perfluoroethyl, perfluoropropyl, methoxy, ethoxy or propoxy groups.

Of advantage in accordance with the invention are hydrogen atoms or methyl groups, which are therefore used with preference. In particular, hydrogen atoms are used. Accordingly, the variables —A—particularly preferred in accordance with the invention are methylene groups.

If in the general formula I at least one of the indices q, r, s and/or t represents at least the number 2, the radical R may also represent a C$_2$-C$_4$ alkanediyl and/or oxaalkanediyl radical which cyclically bridges from 2 to 5 carbon atoms of the radical —A—. Alternatively, the radical —R— may represent an oxygen atom —O— which cyclically bridges from 3 to 5 carbon atoms in the radical -A-. Formed in this way are cyclopentane-1,2- or 1,3-diyl groups, tetrahydrofuran-2, 3-, -2,4-, -2,5- or -3,4-diyl groups, cyclohexane-1,2-, -1,3- or -1,4-diyl groups or tetrahydropyran-2,3-, -2,4-, -2,5- or -2,6-diyl groups, but not epoxide groups.

Examples of central groups I which are especially advantageous in accordance with the invention are derived from the below described tetraols of the general formula II:

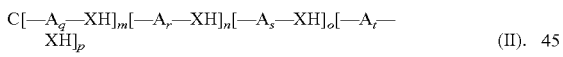
(II).

In the general formula II the indices and the variables have the same definitions as indicated above in connection with the general formula I. In accordance with the invention it is of particular advantage if the variable X is an oxygen atom —O—.

Accordingly, for the preparation of the central group I and of the compounds to be used in accordance with the invention, the tetraols of the general formula II are of particular advantage and are therefore used with particular preference. In the text below they are referred to for brevity as "tetraols II".

Examples of very especially suitable tetraols II for use in accordance with the invention are the symmetrical tetraols pentaerythritol, tetrakis(2-hydroxyethyl)methane or tetrakis (3-hydroxypropyl)methane or the asymmetric tetraols (II1) to (II10):

 (II1)

 (II2)

 (II3)

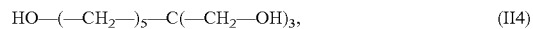 (II4)

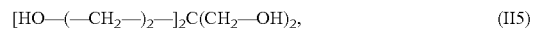 (II5)

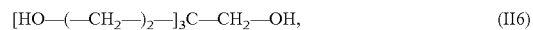 (II6)

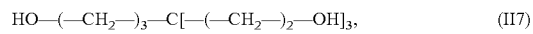 (II7)

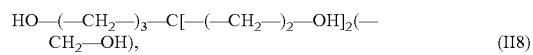 (II8)

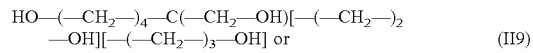 (II9)

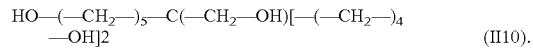 (II10).

Of these, particular attention is drawn to the tetraol (II1) (2,2-bishydroxymethyl-1,4-butanediol; homopentaerythritol) because it imparts especially advantageous properties to the reactive diluents for use in accordance with the invention and hence to the compositions (A) for use in accordance with the invention. For this reason it is used with very particular preference.

In the reactive diluents whose use is particularly preferred in accordance with the invention, the variables —X— described above are connected by way of spacer groups to in each case one hydroxyl group. This also applies analogously to the central groups which are derived from the tetraols ditrimethylolpropane, diglycerol or ditrimethylolethane whose oxygen atoms correspond to the variables —X—. The subsequent description of the spacer groups therefore also applies to these central groups which are different from the central groups I.

In accordance with the invention, all divalent organic radicals R$^1$ are suitable as spacer groups.

Examples of suitable divalent radicals R$^1$ are those derived from at least one of the following organic compounds:

substituted and unsubstituted linear or branched alkanes, alkenes, cycloalkanes, cycloalkenes, alkylcycloalkanes, alkylcycloalkenes, alkenylcycloalkanes, or alkenylcycloalkenes containing no heteroatom or at least one heteroatom in the chain and/or in the ring;

substituted and unsubstituted aromatics or heteroaromatics; and alkyl-, alkenyl-, cycloalkyl-, cycloalkenyl-, alkylcycloalkyl-, alkylcycloalkenyl-, alkenylcycloalkyl- or alkenylcycloalkenyl-substituted aromatics or heteroaromatics whose substituents are unsubstituted or substituted and contain no heteroatom or at least one heteroatom in their chain and/or their ring.

Examples of suitable heteroatoms are oxygen, nitrogen, boron, silicon, sulfur or phosphorus atoms.

Examples of suitable aromatics are benzene and naphthalene.

Examples of suitable heteroaromatics are thiophene, pyridine or triazine.

Examples of suitable alkanes are those having 2 to 20 carbon atoms in the molecule such as ethane, propane, butane, isobutane, pentane, neopentane, hexane, heptane, octane, isooctane, nonane, dodecane, hexadecane or eicosane.

Examples of suitable alkenes are ethylene and propylene.

Examples of suitable cycloalkanes are cyclopentane and cyclohexane.

Examples of suitable cycloalkenes are cyclopentene and cyclohexene.

Examples of suitable alkylcycloalkanes are methylcyclopentane and methylcyclohexane.

Examples of suitable alkylcycloalkenes are methylcyclopentene and methylcyclohexene.

Examples of suitable alkenylcycloalkanes are allyl- and vinylcyclopentane and allyl- and vinylcyclohexane.

Examples of suitable alkenylcycloalkanes are vinylcyclopentene and vinylcyclohexene.

Examples of suitable alkyl, alkenyl, cycloalkyl, cycloalkenyl, alkylcycloalkyl, alkylcycloalkenyl, alkenylcycloalkyl or alkenylcycloalkenyl substituents are methyl, ethyl, propyl, isopropyl, n-butyl, sec-butyl, tert-butyl, vinyl, allyl, cyclohexyl, cyclohexenyl, 4-methylcyclohexyl, 4-methylcyclohexenyl, 3-allylcyclohexenyl or 4-vinylcyclohexenyl.

Examples of suitable substituents, for use in accordance with the invention, of the radicals $R^1$ are all organic radicals which are substantially inert, i.e., which do not undergo any reactions with the compounds used for the construction of the reactive diluents which are particularly preferred in accordance with the invention, or which are used for further reaction thereof, especially halogen atoms, especially fluorine and chlorine atoms, nitro groups, nitrile groups or alkoxy groups.

The spacer groups are connected in particular by way of carbonyl groups to the central groups I or to the central groups which are derived from the other said tetraols.

Examples of organic compounds which are especially suitable for the preparation of these spacer groups are epsilon-caprolactone, hexahydrophthalic acid, hexahydrophthalic anhydride, phthalic acid, phthalic anhydride, hexahydroterephthalic acid, terephthalic acid, fumaric acid, maleic acid, maleic anhydride, itaconic acid, itaconic anhydride, oxalic acid, malonic acid, malonic anhydride, succinic acid, succinic anhydride, glutaric acid, glutaric anhydride, adipic acid, adipic anhydride, pimelic acid, suberic acid, azelaic acid, sebacic acid or decane-, undecane- or dodecanedicarboxylic acid. Of these, epsilon-caprolactone, maleic acid or maleic anhydride and hexahydrophthalic anhydride, in particular hexahydrophthalic anhydride, are especially suitable and are therefore used with particular preference.

In the preparation of the particularly preferred reactive diluents for use in accordance with the invention, the tetraols II or the other said tetraols are reacted with the abovementioned difunctional compounds to form an intermediate into which the hydroxyl groups may be introduced.

Suitable for this purpose are all organic compounds which are able to react with the intermediates to form a hydroxyl group or with retention of a hydroxyl group. In accordance with the invention it is of advantage to use a compound which reacts with the intermediates to form a hydroxyl group.

Examples of highly suitable organic compounds of this kind are compounds containing epoxide groups, especially compounds containing glycidyl groups.

Examples of highly suitable compounds containing epoxide groups, especially compounds containing glycidyl groups, are ethylene oxide, propylene oxide, epichlorohydrin, glycidol, glycidyl ether, especially aryl and alkyl glycidyl ethers, or glycidyl esters, especially the glycidyl esters of tertiary, highly branched, saturated monocarboxylic acids marketed under the trade name Versatic® acids by Deutsche Shell Chemie. Of these, the Versatic® acid glycidyl esters are especially advantageous and are therefore used with very particular preference.

For the present invention it is essential that the above-described reactive diluents are liquid at room temperature. Consequently, either individual liquid hyperbranched compounds may be used, or liquid mixtures of these compounds. This is the case in particular when the high molecular weight and/or symmetry of the hyperbranched compounds used means that, as individual compounds, they are solid. The skilled worker will therefore be able to select the appropriate hyperbranched compounds in a simple manner.

The reactive diluents which are particularly preferred in accordance with the invention may be prepared by the customary and known methods of preparing hyperbranched and dendrimeric compounds. Appropriate synthesis methods are described, for example, in the patents WO 93/17060 or WO 96/12754 or in the book by G. R. Newkome, C. N. Moorefield and F. Vögtle, "Dendritic Molecules, Concepts, Syntheses, Perspectives", VCH, Weinheim, N.Y., 1996.

Further examples of reactive diluents which are preferred in accordance with the invention are the branched reaction products, described in the international patent application WO 96/20968, of branched polycarboxylic acids with at least one monoepoxy ester.

Further examples of reactive diluents particularly preferred in accordance with the invention are the cyclic and/or acyclic $C_9$–$C_{16}$ alkanes functionalized with at least two hydroxyl groups or at least one hydroxyl group and at least one thiol group, and are referred to for the sake of brevity below as "functionalized alkanes".

The functionalized alkanes are derived from branched, cyclic or acyclic alkanes having from 9 to 16 carbon atoms, which in each case form the parent structure.

Examples of suitable such alkanes having 9 carbon atoms are 2-methyloctane, 4-methyloctane, 2,3-dimethylheptane, 3,4-dimethylheptane, 2,6-dimethylheptane, 3,5-dimethylheptane, 2-methyl-4-ethylhexane or isopropylcyclohexane.

Examples of suitable such alkanes having 10 carbon atoms are 4-ethyloctane, 2,3,4,5-tetramethylhexane, 2,3-diethylhexane or 1-methyl-2-n-propylcyclohexane.

Examples of suitable such alkanes having 11 carbon atoms are 2,4,5,6-tetramethylheptane or 3-methyl-6-ethyloctane.

Examples of suitable such alkanes having 12 carbon atoms are 4-methyl-7-ethylnonane, 4,5-diethyloctane, 1'-ethylbutylcyclohexane, 3,5-diethyloctane or 2,4-diethyloctane.

Examples of suitable such alkanes having 13 carbon atoms are 3,4-dimethyl-5-ethylnonane or 4,6-dimethyl-5-ethylnonane.

An example of a suitable such alkane having 14 carbon atoms is 3,4-dimethyl-7-ethyldecane.

Examples of suitable such alkanes having 15 carbon atoms are 3,6-diethylundecane or 3,6-dimethyl-9-ethylundecane.

Examples of suitable such alkanes having 16 carbon atoms are 3,7-diethyldodecane or 4-ethyl-6-isopropylundecane.

Of these parent structures, the alkanes having 10 to 14 and especially 12 carbon atoms are particularly advantageous and are therefore used with preference. Of these, in turn, the octane derivatives, particularly the positionally isomeric diethyloctanediols, are especially advantageous.

For the present invention it is essential that the functionalized alkanes which derive from these branched, cyclic or acyclic alkanes as parent structures are liquid at room temperature. Consequently, it is possible to use either individual liquid functionalized alkanes or liquid mixtures of these compounds. This is the case in particular when the high number of carbon atoms in the alkane parent structure of the functionalized alkanes used means that, as individual compounds, they are solid. The skilled worker will therefore be able to select the appropriate functionalized alkanes or reactive diluents in a simple manner.

For the invention it is also essential that the functionalized alkanes have a boiling point of more than 200, preferably 220 and in particular 240° C. Furthermore, they ought to have a low evaporation rate.

In accordance with the invention it is of advantage, furthermore, if the functionalized alkanes are acyclic.

The functionalized alkanes have primary and/or secondary hydroxyl groups or primary and/or secondary hydroxyl groups and thiol groups. In accordance with the invention it is of advantage if primary and secondary groups of this kind are present in one functionalized alkane.

The functionalized alkanes are accordingly polyols or polyol-polythiols, but especially polyols. These compounds may be used individually or together as mixtures. Particular advantages result if the polyols are diols and/or triols, but especially diols. They are therefore used with very particular preference.

The positionally isomeric diethyloctanediols for use with very particular preference in accordance with the invention contain a linear $C_8$ carbon chain.

With regard to the two ethyl groups, the $C_8$ carbon chain has the following substitution pattern: 2,3, 2,4, 2,5, 2,6, 2,7, 3,4, 3,5, 3,6 or 4,5. In accordance with the invention it is of advantage if the two ethyl groups are in positions 2 and 4, i.e., if the compounds are 2,4-diethyloctanediols.

With regard to the two hydroxyl groups, the $C_8$ carbon chain has the following substitution pattern: 1,2, 1,3, 1,4, 1,5, 1,6, 1,7, 1,8, 2,3, 2,4, 2,5, 2,6, 2,7, 2,8, 3,4, 3,5, 3,6, 3,7, 3,8, 4,5, 4,6, 4,8, 5,6, 5,7, 5,8, 6,7, 6,8 or 7,8. In accordance with the invention it is of advantage if the two hydroxyl groups are in positions 1 and 5, i.e., if the compounds are diethyloctane-1,5-diols.

The two substitution patterns are combined with one another in any desired way; i.e., the diethyloctanediols for use in accordance with the invention comprise 2,3-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,7-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 3,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 3,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 3,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, or 4,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol.

The positionally isomeric diethyloctanediols for use in accordance with the invention may be used as individual compounds or as mixtures of two or more diethyloctanediols for preparing the oligomers and polymers of the invention.

Particular advantages result from the use of 2,4-diethyl-1,5-octanediol.

The reactive diluents described above are compounds which are known per se and can be prepared with the aid of customary and known synthesis methods of organic chemistry, such as base-catalyzed aldol condensation, or are obtained as by-products of chemical industrial syntheses such as the preparation of 2-ethylhexanol.

Further examples of reactive diluents particularly preferred in accordance with the invention are obtained by subjecting oligomers of the formula III

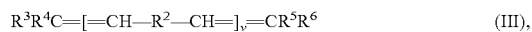

$$R^3R^4C=[=CH-R^2-CH=]_v=CR^5R^6 \quad \text{(III)},$$

in which $R^2$ is —$CH_2$—)$_w$—, in which the index w is an integer from 1 to 6, or is

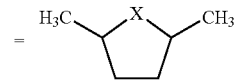

in which X is —$CH_2$— or an oxygen atom;
$R^3$, $R^4$, $R^5$ and $R^6$ independently of one another are hydrogen atoms or alkyl; and
the index v is an integer from 1 to 15;
to hydroformylation and reducing the resultant products III, containing aldehyde groups, to the polyols III, which if desired are partially or fully hydrogenated.

The index v in the formula III represents the number of divalent radicals $R^2$ introduced by ring-opening metathesis reaction into the oligomers I derived from cyclic olefins such as, for example, cyclopropene, cyclopentene, cyclobutene, cyclohexene, cycloheptene, norbornene, 7-oxanorbornene or cyclooctene. Preferably, as great as possible a fraction of the oligomer mixtures III which can be used according to the invention, such as, for example, at least 40% by weight (determined by the area integration of the gas chromatograms; instrument: Hewlett Packard; detector: flame ionization detector; column: DB 5.30 m×0.32 mm, coverage 1μ; temperature program: 60° C. 5 min., isothermal, heating rate 10° C./min, max.: 300° C.), have a value of v>1. The value v and thus the degree of ring-opening metathesis can be influenced, as specified later on below, by the activity of the metathesis catalyst that is used.

The radicals $R^3$, $R^4$, $R^5$ and $R^6$ are independently of one another hydrogen or alkyl, the expression "alkyl" embracing straight-chain and branched alkyl groups.

The alkyl groups in question are preferably straight-chain or branched $C_1$–$C_{15}$, preferably $C_1$–$C_{10}$, with particular preference $C_1$–$C_5$, alkyl groups. Examples of alkyl groups are, in particular, methyl, ethyl, propyl, 1-methylethyl, butyl, 1-methylpropyl, 2-methylpropyl, 1,1-dimethylethyl, n-pentyl, 1-methylbutyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 3-methylpentyl, 4-methylpentyl, 1-2-dimethylbutyl, 1,3-dimethylbutyl, 2,3-dimethylbutyl, 1,1-dimethylpropyl, 1,2,2-trimethylpropyl, 1-ethylbutyl, 2-ethylbutyl, 1-ethyl-2-methylpropyl, n-heptyl, 2-ethylhexyl, 1-methylhexyl, 1-ethylpentyl, 2-ethylpentyl, 1-propylbutyl, octyl, decyl, dodecyl, etc.

The degree of branching and the number of carbon atoms of the terminal alkyl radicals $R^3$, $R^4$, $R^5$ and $R^6$ depend on the structure of the acyclic monoolefins of the hydrocarbon mixture used and on the activity of the catalyst. As detailed below, the catalyst activity influences the degree of cross-metathesis (self-metathesis) of the acyclic olefins, with formation of structurally new olefins, into which then, formally, cyclopentene is inserted in a ring-opening metathesis polymerization.

Preference is given to the use of oligomer mixtures containing an increased fraction of oligomers having only one terminal double bond. The oligomer is preferably prepared by reacting a hydrocarbon mixture comprising a cyclic monoolefin such as cyclopropene, cyclobutene, cyclopentene, cyclohexene, cycloheptene, cyclooctene, norbornene or 7-oxanorbornene, and acyclic monoolefins as well, obtained from the processing of petroleum by cracking ($C_5$ cut), in a homogeneous or heterogeneous metathesis reaction.

The metathesis reaction formally comprises
a) the disproportionation of the acyclic monoolefins of the hydrocarbon mixture by cross-metathesis,
b) the oligomerization of the cyclic monoolefin by ring-opening metathesis,
c) chain termination by reaction of the oligomers from b) with an acyclic olefin of the hydrocarbon mixture or of a product from a),
it being possible to traverse steps a) and/or b) and/or c) a number of times, individually or in combination.

Step a)
The cross-metathesis of the acyclic monoolefins will be illustrated using the example of the metathesis of 1-pentene and 2-pentene:

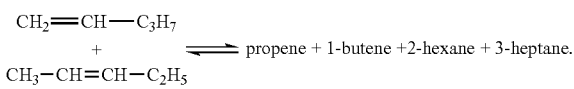

A combination of cross-metathesis of different acyclic olefins and self-metathesis of identical acyclic olefins, such as, for example, the self-metathesis of 1-pentene to ethene and 4-octene, and multiple traversal of this reaction, produces a large number of monoolefins of different structure and with different carbon atom numbers, which form the end groups of the oligomers I. The proportion of cross-metathesis products, which increases as the activity of the catalyst used goes up, also influences the double bond content of the oligomers. Thus, for example, in the case of the self-metathesis of 1-pentene, described above, ethene is liberated, which may if appropriate escape in the form of a gas, removing one double bond equivalent from the reaction. At the same time, there is an increase in the fraction of oligomers without terminal double bonds. In the above example, therefore, an oligomer without terminal double bonds is formed, for example, by insertion of cyclic monoolefin into 4-octene.

Step b)
The average number of insertions of the cyclic monoolefin into the growing chain in a ring-opening metathesis polymerization determines the average molecular weight of the resulting oligomer mixture III. Preferably, oligomer mixtures I having an average molecular weight of at least 274 g per mole are formed by the process of the invention, which corresponds to an average number of three units of a cyclic monoolefin per oligomer.

Step c)
Chain termination takes place by reaction of oligomers that still have an active chain end in the form of a catalyst complex (alkylidene complex) with an acylic olefin; in the course of this reaction, ideally, an active catalyst complex is recovered. In that case, the acyclic olefin may originate unchanged from the hydrocarbon mixture originally used for the reaction, or may have been modified beforehand in a cross-metathesis in accordance with stage a).

Very generally, the process is suitable for preparing oligomers III from hydrocarbon mixtures which comprise acyclic and cyclic monoolefins: monoolefins such as, for example, cyclobutene, cyclopentene, cyclohexene, cycloheptene, norbornene or 7-oxanorbornene, especially cyclopentene. Variants of this process are described, for example, in the article by M. Schuster and S. Bleckert in Angewandte Chemie, 1997, Volume 109, pages 2124 to 2144.

Preference is given to the use of a hydrocarbon mixture obtained industrially in the processing of petroleum, it being possible if desired to subject said mixture to catalytic partial hydrogenation beforehand in order to remove dienes. A particularly suitable mixture for use in the present process is, for example, a mixture enriched in saturated and unsaturated $C_5$ hydrocarbons ($C_5$ cut). To obtain the $C_5$ cut it is possible, for example, first to subject pyrolysis benzine obtained in the steam cracking of naphtha to a selective hydrogenation in order to convert, selectively, the dienes and acetylenes present into the corresponding alkanes and alkenes, and subsequently to subject the product to a fractional distillation, producing firstly the $C_6$–$C_8$ cut, which is important for further chemical syntheses and comprises the aromatic hydrocarbons, and secondly the $C_5$ cut, which is used for the process of the invention.

The $C_5$ cut generally has a total olefin content of at least 30% by weight, preferably at least 40% by weight, in particular at least 50% by weight.

Suitable in this context are $C_5$ hydrocarbon mixtures having a total cyclopentene content of at least 5% by weight, preferably at least 10% by weight, in particular at least 12% by weight, and generally not more than 30% by weight, preferably not more than 20% by weight.

Furthermore, suitable $C_5$ hydrocarbon mixtures have a proportion of pentene isomers among the acyclic monoolefins of at least 70% by weight, preferably at least 80% by weight, in particular at least 90% by weight.

The preparation process can also be performed with a $C_5$ cut which is obtained industrially and has a total olefin content of, for example, from 50 to 60% by weight, such as about 56%, a cyclopentene content of, for example, from 10 to 20% by weight, such as about 15% by weight, and a pentene isomer content of, for example, from 33 to 43% by weight, such as about 38% by weight, with about 16% by weight being accounted for by the n-pentene and about 22% by weight by isomeric pentenes.

In one specific embodiment, the hydrocarbon mixture used in the preparation process comprises the $C_5$ cut and a petroleum fraction containing acyclic $C_4$ olefins (raffinate 2).

In another specific embodiment of the preparation process, a hydrocarbon mixture is used which comprises the $C_5$ cut and ethene. In this case, oligomer mixtures III having an increased double bond content are obtained. This is achieved first by ethenolysis of the acyclic n- and iso-pentenes present in the $C_5$ cut to give shorter-chain α-olefins, such as propene and 1-butene, which react with cyclopentene in a ring-opening metathesis reaction to form oligomers III having in each case one terminal double bond. In addition, in the presence of ethene, the self-metathesis of the acyclic olefins to form further ethene, such as, for example, the self-metathesis of 1-pentene to form ethene and 4-octene, which as a chain terminating reagent leads to products without terminal double bonds, is suppressed. Secondly, a further increase in the double bond content is achieved by ethenolysis of cyclopentene with ethene to give 1,6-heptadiene. This results in sequences of oligomers each of which have two terminal double bonds. When oligomer mixtures III obtained in this way, having an increased double bond content, are used for the functionalization, the result is preferably oligomer mixtures III having an increased density of functionalities.

Suitable catalysts for the metathesis are known from the prior art and include homogeneous and heterogeneous catalyst systems. In general, the catalysts suitable for the preparation process are based on a transition metal from transition group 6, 7 or 8 of the Periodic Table, with preference being given to the use of catalysts based on Mo, W, Re and Ru.

Suitable homogeneous catalyst systems are generally transition metal compounds, which, if appropriate in combination with a cocatalyst and/or, if appropriate, in the presence of the olefin reactants, are capable of forming a catalytically active metal carbene complex.

Such systems are described, for example, by R. H. Grubbs in Comprehensive Organometallic Chemistry, Pergamon Press, Ltd., New York, Volume 8, page 499 ff. (1982).

Suitable catalyst/cocatalyst systems based on W, Mo and Re may comprise, for example, at least one soluble transition metal compound and an alkylating agent. Examples include $MoCl_2(NO)_2(PR_3)_2/Al_2(CH_3)_3Cl_3$; $WCl_6/BuLi$; $WCl_6/ElAlCl_2(Sn(CH_3)_4)/EtOH$; $WOCl_4/Sn(CH_3)_4$; $WOCl_2(O-[2,6-Br_2-C_6H_3]/Sn(CH_3)_4$; $CH_3ReO_3/C_2H_5AlCl_2$, with the four last-mentioned ones being preferred for the process of the invention.

Further transition metal-alkylidene complexes suitable as metathesis catalysts are described by R. R. Schrock in Accounts of Chemical Research, Volume 23, page 158 ff. (1990). In general, the complexes in question are tetracoordinated Mo- and W-alkylidene complexes additionally containing two bulky alkoxy ligands and one imido ligand. For the process of the invention, preference is given to $((CH_3)_3CO)_2Mo(=N-[2,6-(i-C_3H_7)_2-C_6H_3])(=CHC(CH_3)_2C_6H_5)$ and $[(CF_3)_2C(CH_3)O]_2Mo(=N-[2,5-(i-C_3H_7)-C_6H_3])(=CH(CH_3)_2C_6H_5)$.

In particular, homogeneous metathesis catalysts used are the catalysts described in Angewandte Chemie, Volume 107, pages 2179 ff. (1995), in Journal of the American Chemical Society, Volume 118, page 100 ff. (1996), and in Journal of the Chemical Society, Chemical Communications, page 1127 ff. (1995). In particular, these include $RuCl_2(=CHR)(PR'_3)_2$, preferably $RuCl_2(=CHC_6H_5)(P(C_6H_{11})_3)_2$, $(\eta^6\text{-p-cymene})RuCl_2(p(C_6H_{11})_3)$ and 3 molar equivalents of diazoalkane $((CH_3)_3SiCHN_2$ or $C_6H_5CHN_2)$ produced "in situ".

Suitable heterogeneous catalyst systems generally comprise a transition metal compound on an inert support, said compound being capable without a cocatalyst of forming a catalytically active alkylidene complex by reaction with the olefin reactants. It is preferred to use $Re_2O_7$ and $CH_3ReO_3$.

Suitable inorganic supports are the oxides customary for this purpose, especially silicon oxides and aluminum oxides, aluminosilicates, zeolites, carbides, nitrides, etc., and mixtures thereof. Preferred supports used are $Al_2O_3$, $SiO_2$ and mixtures thereof, in combination with $B_2O_3$ and $Fe_2O_3$ if desired.

The aforementioned homogeneous and heterogeneous catalyst systems differ greatly in their catalytic activity, so that the individual catalysts may have different optimum reaction conditions for the metathesis. As already described above, the catalytic activity with respect to the cross-metathesis (step a)) also influences the product distribution of the oligomer mixtures III derived from cyclopentene. For instance, the ruthenium-based homogeneous catalyst systems $RuCl_2(=CHC_6H_5)(P(C_6H_{11})_3)_3$, $(\eta^6\text{-p-cymene})RuCl_2-(P(C_6H_{11})_3)/(CH_3)_3SICHN_2$ and $(\eta^6\text{-p-cymene})RuCl_2(P(C_6H_{11})_3)/C_6H_5CHN_2$ are particularly suitable for the preparation process. Of these, the first-mentioned ruthenium complex has a higher catalytic activity than the two last-mentioned ones, which under otherwise identical reaction conditions leads to higher space/time yields. At the same time, however, there is also an increased incidence of cross-metathesis in the case of the first complex, with the release, in part, of ethene as well, with the consequence that the resulting oligomer mixture III derived from cyclopentene has a somewhat smaller fraction of double bonds, which is manifested, for example, in a lower iodine number. Furthermore, owing to the cross-metathesis, a larger number of acyclic olefins without terminal double bonds is available, so that using the first-mentioned homogeneous ruthenium catalyst the proportion of oligomers III derived from cyclopentene having only one, or no, terminal double bond is increased. The two last-mentioned ruthenium complexes have a somewhat lower catalytic activity than the first-mentioned one, so that using them, in accordance with the process of the invention, cyclopentene-derived oligomer mixtures I are obtained which have a higher double bond fraction and thus a higher iodine number and also a larger fraction of terminal double bonds.

The heterogeneous catalyst systems as well have the above-described activity differences with the corresponding influence on the metathesis products. If $CH_3ReO_3$ on $Al_2O_3$ is used as a heterogeneous catalyst for the preparation process, it has a higher catalytic activity than the corresponding homogeneous catalyst system comprising $CH_3ReO_3/(C_2H_5)AlCl_2$.

As a heterogeneous catalyst it is advantageous to use $Re_2O_7$ on $Al_2O_3$. This has an activity approximately comparable with that of $RuCl_2(=CHC_6H_5)(P(C_6H_{11})_3)_2$ and also similar product distribution, and may be used again following regeneration in a stream of air at elevated temperatures, such as about 550° C., for example.

If desired, therefore, depending on the catalyst used, it is possible to obtain cyclopentene-derived oligomer mixtures III having varying double bond fractions and varying fractions of terminal double bonds.

In one specific embodiment of the preparation process, the metathesis catalyst used is a homogeneous, ruthenium-based catalyst selected from $RuCl_2(=CHC_6H_5)(P(c_6H_{11})_3)_2$, $(\eta^6\text{-p-cymene})RuCl_2(P(C_6H_{11})_3)/(CH_3)_3SiCHN_2$ and $(\eta^6\text{-p-cymene})RuCl_2(P(C_6H_{11})_3)/C_6H_5CHN_2$, which is added to the reaction mixture as a solution in an organic solvent. Examples of suitable solvents are aromatic hydrocarbons, such as toluene and xylene, and also halogenated alkanes, such as $CH_2Cl_2$, $CHCl_3$, etc.

In the case of reactive catalyst systems, the reaction temperature is from −20 to 200° C., preferably from 0 to 100° C., in particular from 20 to 80° C.

The reaction may be conducted at an increased pressure up to 5 bar, preferably up to 2 bar, or, with particular preference, at ambient pressure.

According to another specific embodiment of the preparation process, the metathesis catalyst used is a heterogeneous catalyst based on rhenium, selected from $CH_3ReO_3/Al_2O_3$ and preferably $Re_2O_7/Al_2O_3$, which is added to the reaction mixture without addition of solvent.

In the case of these catalysts, which are somewhat less active than the aforementioned homogeneous catalyst systems, the reaction temperature is from about 20 to 120° C., in particular from 40 to 80° C.

The reaction is preferably conducted at an increased pressure from 2 to 20 bar, preferably from 3 to 15 bar, in particular from 4 to 12 bar.

In terms of process regime, the preparation process can be performed either continuously or batchwise. Suitable reaction apparatuses are known to the skilled worker and are described, for example, in Ullmanns Enzyklopädie der technischen Chemie, Volume 1, page 743 ff. (1951). They include stirred vessels for the batchwise process, for example, and tube reactors for the continuous process, for example.

According to a suitable batchwise variant of the preparation process it is possible, for example, to react the $C_5$ cut over one of the homogeneous ruthenium catalysts described above as being preferred, which if desired is generated "in situ" in the reactor vessel, in a metathesis reaction to give the cyclopentene-derived oligomer mixtures III.

According to a further suitable continuous variant of the preparation process, the $C_5$ cut may be reacted, for example, in a tube reactor over one of the heterogeneous rhenium catalysts described above as being preferred.

In accordance with both possible process variants, and depending on the catalyst used and on the other reaction parameters, especially the reaction temperature, space/time yields of at least 10 g $l^{-1} h^{-1}$, preferably at least 15 g $l^{-1} h^{-1}$, are achieved. Depending on the activity of the catalyst, however, it is also possible to obtain substantially higher space/time yields of up to about 500 g $l^{-1} h^{-1}$.

The reaction mixture is separated by customary methods. These include, for example, fractional distillation, at atmospheric or reduced pressure, or separation at elevated temperatures and atmospheric pressure in a falling-film evaporator. Low-boiling fractions containing still-unreacted olefins may if desired be recycled to the reaction apparatus. Advantageously, a more extensive reaction of the olefins present in the $C_5$ cut to oligomers III is achieved in the course of the preparation process, so that the low boilers which are separated off comprise a $C_5$ hydrocarbon mixture with predominantly saturated cyclic and acyclic compounds.

As described above, the number and position of the double bonds in the oligomers III may be influenced by the reaction conditions, especially the catalyst that is used in each case. According to the process described, cyclopentene oligomers III are obtained, where the iodine number is at least 250 g $I_2$/100 g oligomers III, preferably at least 300 g $I_2$/100 g oligomers I.

The average molecular weight of these oligomers III derived from cyclic monoolefins, especially cyclopentene, is at least 274 g/mol, which corresponds to an average conversion of three cyclopentene units per oligomer III, with chain termination by an acyclic pentene (and not by a cross-metathesis product) being assumed in this case.

In order to prepare the reactive diluents for use in accordance with the invention, the oligomers III detailed above are subjected to customary and conventional hydroformulation. Here, in general, the oligomers III are reacted with hydrogen and carbon monoxide in the presence of catalysts containing suitable transition metals under atmospheric pressure or under superatmospheric pressure at temperatures from 50 to 150° C. to give products III containing aldehyde groups.

An example of a suitable transition metal is rhodium.

The resultant products III are isolated and are reduced in a customary and known manner to the reactive diluents for use in accordance with the invention. Reducing agents suitable for this purpose are all those with which aldehyde groups can be reduced to hydroxyl groups. Examples of suitable reducing agents are borohydrides, such as sodium tetrahydro-boranate, or hydrogen in the presence of hydrogenation catalysts.

Examples of suitable hydroformylation and reduction processes are described in the European patent EP-A-0 502 839.

The reactive diluents particularly preferred in accordance with the invention may be subjected in a customary and known manner to partial or complete hydrogenation. Suitable reducing agents for this purpose include those mentioned above.

The reactive diluents particularly preferred in accordance with the invention have a hydroxyl number (OHN) of from 200 to 650, in particular from 250 to 450. Their number-average molecular weight $M_n$, determined with the aid of gel permeation chromatography using polystyrene as the internal standard, lies within the range from 400 to 1 000, in particular from 400 to 600. Their mass-average molecular weight $M_w$, determined with the aid of gel permeation chromatography and polystyrene as the internal standard, lies within the range from 600 to 2 000, in particular from 600 to 1 100. The polydispersity $M_w/M_n$ is from 1.4 to 3, in particular from 1.7 to 1.9.

A particularly outstanding reactive diluent for use in accordance with the invention has an OHN of 350, an $M_n$ of 561 and an $M_w$ of 1 068.

A certain fraction of the reactive diluents for use in accordance with the invention in a liquid composition (A) may be modified, following the copolymerization, with suitable olefinically unsaturated compounds, so that the resulting liquid composition (A) may be cured both thermally and by actinic radiation. Examples of suitable compounds for such a modification are the above-described higher polyfunctional monomers (a).

The radical copolymerization of the mixture has no special features in terms of its method but instead takes place with the methods of continuous or batchwise copolymerization that are customary and known in the plastics field, under atmospheric pressure or superatmospheric pressure in stirred tanks, autoclaves, tube reactors or Taylor reactors.

Examples of suitable copolymerization processes are described in the patents DE-A-197 09 465, DE-C-197 09 476, DE-A-28 48 906, DE-A-195 24 182, EP-A-0 554 783, WO 95/27742 or WO 82/02387.

Examples of suitable reactors are stirred tanks, cascades of stirred tanks, loop reactors or Taylor reactors.

Taylor reactors, which serve to convert substances under the conditions of Taylor flow, are known. They consist essentially of two coaxial concentric cylinders of which the outer is fixed while the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. As well as the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$ and the gap width d, the difference between the two radii, in accordance with the following formula:

$$Ta = \omega_i r_i d v^{-1} (d/r_i)^{1/2} \quad (I)$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or a vortex cell.

The basis of this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The viscosity force acts counter to the centrifuigal force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

Of advantage here are Taylor reactors having an external reactor wall located within which there is a concentrically or eccentrically disposed rotor, a reactor floor and a reactor lid, which together define the annular reactor volume, at least one means for the metered addition of reactants, and a means for the discharge of product, where the reactor wall and/or the rotor are or is geometrically designed in such a way that the conditions for Taylor vortex flow are met over substantially the entire reactor length in the reactor volume, i.e. in such a way that the annular gap broadens in the direction of flow traversal.

The copolymerization is initiated by initiators. Examples of suitable initiators are thermolabile initiators which form free radicals, such as organic peroxides, organic azo compounds or C—C cleaving intiators such as dialkyl peroxides, peroxocarboxylic acids, peroxodicarbonates, peroxide esters, hydroperoxides, ketone peroxides, azo dinitriles or benzpinacol silyl ethers; especially tert-butylperoxyethylhexanoate, benzoyl peroxide, di-tert-amyl peroxide, azobisisobutyronitrile and tert-butyl perbenzoate. The initiators are used preferably in an amount of from 1 to 25% by weight, with particular preference from 2 to 10% by weight, based on the overall weight of the monomers (a) and initiator.

The copolymerization is appropriately conducted at a temperature of from 80 to 200° C., preferably 110 to 180° C.

Preferably, in the copolymerization of the reactor diluents and [lacuna], if desired at least a portion of the mixture (A1) are introduced as an initial charge to the reaction vessel, after which the mixture (A1) or the remainder of the mixture (A1) and also a solution of at least one initiator are metered in by way of separate feed streams In the course of the copolymerization.

Or else at least one selected monomer (a) of the mixture (A1) is introduced as an initial charge to the reaction vessel, and remaining monomers (a) of the mixture (A1) are metered in in the course of the copolymerization.

The two abovementioned variants may also be conducted in two stages, i.e., the monomers (a) present in the initial charge are polymerized partly or fully, after which the remaining monomers (a) of the mixture (A1) are metered in and polymerized.

The amount and rate of addition of the initiator is preferably chosen so as to give a copolymer, especially a polyacrylate resin, having the desired number-average molecular weight Mn. It is preferred to commence the addition of initiator some time, generally from about 1 to 15 minutes, before commencing the addition of the monomers. Preference is also given to a method wherein the addition of initiator is commenced at the same point in time as the addition of the monomers (a) and is ended from about half an hour to two hours after the addition of the monomers has been ended. The initiator is preferably added in a constant amount per unit time. After the end of the addition of initiator, the reaction mixture is generally held at polymerization temperature until (generally 1.5 hours) all of the monomers used have undergone essentially complete reaction. "Essentially complete reaction" is intended to denote that preferably 100% by weight of the monomers used have undergone reaction but that it is also possible for a small residual monomer content of not more than up to about 0.5% by weight, based on the weight of the reaction mixture, to remain unreacted.

The monomers (a) are preferably polymerized at a polymerization solids of at least 70% by weight, based on the monomers (a).

The second essential constituent of the inventive coating material is the hydroxyl-containing polyaddition resin (polyadduct) (B). It is present in the inventive coating material in an amount of from 5 to 70%, preferably from 10 to 65%, more preferably from 12 to 60%, with particular preference from 15 to 55%, and in particular from 20 to 50% by weight, based in each case on the solids content of the coating material. It has a number-average molecular weight Mn of 800 to 3500, preferably from 900 to 3000, more preferably from 950 to 2800, with particular preference from 1000 to 2600, with very particular preference from 1100 to 2400, and in particular from 1200 to 2200 (determined by means of gel permeation chromatography and polystyrene as internal standard). Its viscosity (measured on an 80% strength solution in butyl acetate) is preferably situated below 80 dPas. Further advantages arise if the polydispersity of the molecular weight Mw/Mn, is situated below 10, preferably below 7, more preferably below 5, with particular preference below 4, with very particular preference below 3 and in particular below 2. Not least, it is of particular advantage if the acid number of the polyadducts (B) is below 10, preferably 9, with particular preference 8, with very particular preference 7, and in particular 6, mg KOH/g.

Basically, all oligomeric polyadducts are suitable if they have the specifications described above. For further details of the terms "polyaddition resins" and "polyadducts", refer to Römpp Lexikon Lacke und Druckfarben, Georg Thieme Verlag, Stuttgart, N.Y., 1998, page 457, "polyaddition" and "polyaddition resins (polyadducts)", and also pages 463 and 464, "polycondensates", "polycondensation" and "polycondensation resins".

Examples of highly suitable polyadducts (B) are branched oligoethers, oligoesters, oligocarbonates, oligourethanes, oligoureas, oligoamides, oligoimides or cooligomers containing ether, ester, carbonate, urethane, urea, amide and/or imide groups in the oligomer chains.

Examples of very highly suitable polyadducts (B) are branched oligoesters, oligourethanes, oligoester-co-oligoethers, oligoester-co-oligocarbonates, oligoester-co-oligourethanes, oligoester-co-oligoamides, oligoester-co-oligoureas or oligoester-co-oligoimides, especially oligoesters.

Examples of especially suitable polyadducts (B) are branched oligoesters, especially oligoesters preparable by reacting at least one branched polycarboxylic acid with at least one monoepoxy ester and/or by reacting a polyol with a carboxylic anhydride and reacting the resultant intermediate with an epoxide.

Examples of outstandingly suitable branched oligoesters (B) are the above-described hyperbranched reactive diluents and the branched reaction products, described in the international patent application WO 96/20968, of branched polycarboxylic acids with at least one monoepoxy ester.

The preparation of the polyadducts (B) has no special features but instead takes place in accordance with the customary and known methods of organic chemistry and of oligomer chemistry. For further details, refer here again to Römpp Lexikon Lacke und Druckfarben, Georg Thieme Verlag, Stuttgart, N.Y., 1998, page 457, "polyaddition" and "polyaddition resins (polyadducts)", and also pages 463 and 464, "polycondensates", "polycondensation" and "polycondensation resins".

The third essential constituent of the inventive coating material is at least one crosslinking agent (C).

The crosslinking agent (C) is present in the inventive coating material in an amount, based in each case on the solids content of the coating material, of from 5 to 70%, preferably from 10 to 65%, more preferably from 12 to 60%, with particular preference from 15 to 55%, and in particular from 20 to 50% by weight.

Where the coating material comprises a two-component or multicomponent system, polyisocyanates and/or polyepoxides, but especially polyisocyanates, are used as crosslinking agents (C).

Examples of suitable polyisocyanates (C) are organic polyisocyanates, especially so-called paint polyisocyanates, having free isocyanate groups attached to aliphatic, cycloaliphatic, araliphatic and/or aromatic moieties. Preference is given to polyisocyanates having from 2 to 5 isocyanate groups per molecule and viscosities of from 100 to 10,000, preferably from 100 to 5000, and in particular from 100 to 2000 mPa.s (at 23° C.). If desired, small amounts of organic solvent (H), preferably from 1 to 25% by weight based on straight polyisocyanate, may be added to the polyisocyanates in order to make it easier to incorporate the isocyanate and, if appropriate, to reduce the viscosity of the polyisocyanate to a level within the abovementioned ranges. Examples of suitable solvent additives to the polyisocyanates are ethoxyethyl propionate, amyl methyl ketone, and butyl acetate. Furthermore, the polyisocyanates (C) may have been hydrophilically or hydrophobically modified in a customary and known manner.

Examples of suitable polyisocyanates (C) are described, for example, in "Methoden der organischen Chemie", Houben-Weyl, Volume 14/2, 4th Edition, Georg Thieme Verlag, Stuttgart, 1963, pages 61 to 70, and by W. Siefken, Liebigs Annalen der Chemie, Volume 562, pages 75 to 136.

Further examples of suitable polyisocyanates (C) are polyisocyanates containing isocyanurate, biuret, allophanate, iminooxadiazinedione, urethane, urea and/or uretdione groups. Polyisocyanates containing urethane groups, for example, are prepared by reacting some of the isocyanate groups with polyols, such as trimethylolpropane and glycerol, for example. Preference is given to the use of aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate, or 1,3-bis(isocyanatomethyl)cyclohexane (BIC), diisocyanates derived from dimeric fatty acids, as marketed under the commercial designation DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane, or mixtures of these polyisocyanates.

Examples of suitable polyepoxides (C) are all known aliphatic and/or cycloaliphatic and/or aromatic polyepoxides, examples being those based on bisphenol A or bisphenol F. Other suitable examples of polyepoxides are the polyepoxides available commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether).

In the case of the one-component systems, crosslinking agents (C) are used which react at relatively high temperatures with the functional groups of the binders to build up a three-dimensional network. Of course, such crosslinking agents (C) may be used as well in the multicomponent systems, in minor amounts. In the context of the present invention, a "minor amount" is a proportion which does not disrupt, let alone prevent, the principal crosslinking reaction.

Examples of suitable crosslinking agents (C) of this kind are blocked polyisocyanates. Examples of suitable polyisocyanates for preparing the blocked polyisocyanates are those described above.

Examples of suitable blocking agents are the blocking agents known from the U.S. Pat. No. 4,444,954, such as i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monopropyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, imidazoles or triazoles; and also xvii) mixtures of these blocking agents, especially dimethylpyrazole and triazoles, malonic esters and acetoacetic esters or dimethylpyrazole and succinimide.

As crosslinking agents (C) it is also possible to use tris(alkoxycarbonylamino)triazines (TACT) of the general formula

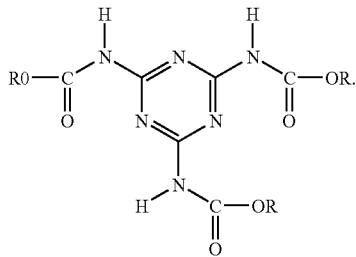

Examples of suitable tris(alkoxycarbonylamino)triazines (C) are described in the patents U.S. Pat. Nos. 4,939,213, 5,084,541 or EP-A-0 624 577. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize out.

In particular it is possible as crosslinking agents (C) to use amino resins, examples being melamine resins, guanamine resins or urea resins. In this instance, use can be made of any amino resin suitable for transparent topcoats or clearcoats, or of a mixture of such amino resins. For further details, refer to Römpp Lexikon Lacke und Druckfarben, Georg Thieme Verlag, 1998, page 29, "Amino resins", and the textbook "Lackadditive" [Additives for coatings] by Johan Bieleman, Wiley-VCH, Weinheim, N.Y., 1998, pages 242 ff., or the book "Paints, Coatings and Solvents", second completely revised edition, D. Stoye and W. Freitag (eds.), Wiley-VCH, Weinheim, N.Y., 1998, pages 80 ff. Also suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207.

Further examples of suitable crosslinking agents (C) are beta-hydroxyalkylamides such as N,N,N',N'-tetrakis(2-hydroxyethyl)adipamide or N,N,N',N'-tetrakis(2-hydroxypropyl)adipamide.

Further examples of suitable crosslinking agents (C) are siloxanes, especially siloxanes containing at least one trialkoxy- or dialkoxysilane group.

Further examples of suitable crosslinking agents (C) are polyanhydrides, especially polysuccinic anhydride.

Further examples of suitable crosslinking agents (C) are compounds containing on average at least two groups capable of transesterification, examples being reaction products of malonic diesters and polyisocyanates or reaction products of monoisocyanates with esters and partial esters of malonic acid with polyhydric alcohols, as described in the European patent EP-A-0 596 460.

The inventive coating material may be used for producing decorative and/or protective coatings, especially paint systems such as transparent clearcoats, primer systems, particularly antistone chip primers and surfacers, or color and/or effect coating systems, especially topcoats and basecoats. The coating systems may be composed of one or more coats.

For these end uses, customary coatings additives (D) are generally added in effective amounts to the inventive coating material. The nature and amount of the additives (D) are guided primarily by the intended use of the inventive coating material. Preferably, these additives (D) are not volatile under the processing and application conditions of the inventive coating material.

Where the inventive coating material is used as a surfacer, topcoat or basecoat material, it comprises color and/or effect pigments (D) in customary and known amounts. The pigments (D) may be organic or inorganic compounds and may impart effect and/or color. The inventive coating material therefore ensures, on the basis of this large number of suitable pigments (D), a universal scope for use of the coating materials, and makes it possible to realize a large number of color shades and optical effects.

As effect pigments (D) it is possible to use metal flake pigments such as commercial aluminum bronzes, aluminum bronzes chromated in accordance with DE-A-36 36 183, and commercial stainless steel bronzes, and also nonmetallic effect pigments, such as pearlescent pigments and interference pigments, for example. Examples of suitable inorganic color pigments (D) are titanium dioxide, iron oxides, Sicotrans yellow and carbon black. Examples of suitable organic color pigments are indanthrene blue, Cromophthal red, Irgazine orange and Heliogen green. For further details, refer to Römpp Lexikon Lacke und Druckfarben, Georg Thieme Verlag, 1998, page 176, "Effect pigments", and pages 451 to 453, "Pigments" to "Pigment volume concentration".

Furthermore, the inventive coating material, particularly as a surfacer, can comprise organic and inorganic fillers in customary and known, effective amounts. Examples of suitable fillers are chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers or woodflour. For further details refer to Römpp Lexikon Lacke und Druckfarben, Georg Thieme Verlag, 1998, pages 250 ff., "Fillers".

These additives (D) may also be incorporated into the coating materials by way of pigment pastes, with suitable grinding resins including the copolymers described above.

These additives are absent if the inventive coating materials are used as clearcoat materials.

Examples of suitable additives which may be present in the inventive clearcoat materials, surfacers, basecoat materials and topcoat materials are

- customary and known oligomer and polymer binders such as thermally curable hydroxyl-containing or actinic-radiation-curable linear and/or branched and/or block, comb and/or random poly(meth)acrylates or acrylate copolymers, polyesters, alkydes, polyurethanes, acrylated polyurethanes, acrylated polyesters, polylactones, polycarbonates, polyethers, epoxy resin-amine adducts, (meth)acrylatediols, partially hydrolyzed polyvinyl esters or polyureas, or actinic-radiation-curable (meth)acryloyl-functional (meth)acrylate copolymers, polyether acrylates, polyester acrylates, unsaturated polyesters, epoxy acrylates, urethane acrylates, amino acrylates, melamine acrylates, silicone acrylates, and the corresponding methacrylates;
- customary and known reactive diluents curable thermally and/or with actinic radiation, such as the diethyloctanediols for use in accordance with the invention, as such, (meth)acrylates with a functionality of two or more, or polyisocyanates containing (meth)acrylate groups;
- low and high-boiling organic solvents ("long solvents);
- UV absorbers;
- light stabilizers such as HALS compounds, benzotriazoles or oxalanilides;
- radical scavengers;
- thermolabile radical initiators such as organic peroxides, organic azo compounds or C—C cleaving initiators such as dialkyl peroxides, peroxocarboxylic acids, peroxodicarbonates, peroxide esters, hydroperoxides, ketone peroxides, azo dinitriles or benzpinacol silyl ethers;
- crosslinking catalysts such as dibutyltin dilaurate, lithium decanoate or zinc octate;
- devolatilizers such as diazadicycloundecane;
- photoinitiators such as those of the Norrish II type, whose mechanism of action is based on an intramolecular variant of the hydrogen abstraction reactions as occur diversely in photochemical reactions (reference may be made here, by way of example, to Römpp Chemie Lexikon, 9$^{th}$; see expanded and revised edition, Georg Thieme Verlag, Stuttgart, Vol. 4, 1991) or cationic photoinitiators (reference may be made here, by way of example, to Römpp Lexikon Lacke und Druckfarben, Georg Thieme Verlag, Stuttgart, 1998, pages 444 to 446), especially benzophenones, benzoins or benzoin ethers, or phosphine oxides;
- slip additives;
- polymerization inhibitors such as phosphites;
- defoamers;
- emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols;
- wetting agents such as siloxanes, fluorine compounds, carboxylic monoesters, phosphoric esters, polyacrylic acids and their copolymers, or polyurethanes;
- adhesion promoters such as tricyclodecanedimethanol;
- leveling agents;
- film-forming auxiliaries such as cellulose derivatives;
- transparent fillers based on silica, alumina or zirconium oxide; for further details refer to Römpp Lexikon Lacke und Druckfarben, Georg Thieme Verlag, Stuttgart, 1998, pages 250 to 252;
- Sag control agents such as ureas, modified ureas and/or silicas, as described, for example, in the references EP-A-192 304, DE-A-23 59 923, DE-A-18 05 693, WO 94/22968, DE-C-27 51 761, WO 97/12945 or "farbe+lack", 11/1992, pages 829 ff.;
- rheology control additives such as those known from the patents WO 94/22968, EP-A-0 276 501, EP-A-0 249 201 or WO 97/12945; crosslinked polymeric microparticles, such as disclosed, for example, in EP-A-0 008 127; inorganic phyllosilicates such as aluminum-magnesium silicates, sodium-magnesium and sodium-magnesium-fluorine-lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates;
- flame retardants and/or
- flatting agents such as magnesium stearate.

Further examples of suitable coatings additives (G) are described in the textbook "Lackadditive" [Additives for Coatings] by Johan Bieleman, Wiley-VCH, Weinheim, N.Y., 1998.

The inventive coating materials are admixed with these additives (D) in amounts which are conventional, known and effective and are, depending on additive (D), from 0.001 to 500 parts by weight per 100 parts by weight of the inventively essential constituents (A), (B) and (C).

The preparation of the inventive coating material from its constituents (A), (B) and (C) and also, if appropriate, (D) has no special features but instead takes place in a customary and known manner by mixing said constituents in appropriate mixing equipment such as stirred tanks, dissolvers or extruders in accordance with the techniques suitable for the preparation of the respective coating materials.

The coating material of the invention is used to produce the inventive coatings, especially multicoat systems ML, on primed or unprimed substrates.

Suitable coating substrates are all surfaces which are undamaged by curing of the coatings present thereon using heat and, if appropriate, actinic radiation; examples are the inventive moldings, films and fibers, metals, plastics, wood, ceramic, stone, textile, fiber composites, leather, glass, glass fibers, glass wool, rock wool, mineral- and resin-bound building materials, such as plasterboard and cement slabs or roof shingles, and also assemblies of these materials.

Accordingly, the coating material of the invention is also suitable for applications outside of vehicle finishing, especially automobile finishing. In this context it is especially suitable for coating furniture and for industrial coating, including coil coating, container coating and the impregnation or coating of electrical components. In the context of industrial coatings it is suitable for coating virtually all parts for private or industrial use, such as radiators, domestic appliances, small metal parts such as nuts and bolts, hub caps, wheel rims, packaging or electrical components such as motor windings or transformer windings.

In the case of electrically conductive substrates it is possible to use primers which are produced in a customary and known manner from electrocoat materials. For this purpose, both anodic and cathodic electrocoat materials are suitable, but especially cathodics.

Using the multicoat system of the invention it is also possible in particular to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviated codes in accordance with DIN 7728T1). The plastics to be coated may of course also be polymer blends, modified plastics, or fiber reinforced plastics. It is also possible to employ the plastics commonly used in vehicle construction, especially motor vehicle construction.

Unfunctionalized and/or nonpolar substrate surfaces may be subjected prior to coating in a known manner to a pretreatment, such as with a plasma or by flaming, or may be provided with a water-based primer.

The multicoat systems ML of the invention may be produced in a variety of ways.

In a first preferred variant, the process of the invention comprises the following steps:
(I) preparing a surfacer film by applying a surfacer to the substrate,
(II) curing the surfacer film to give the surfacer coat,
(III) preparing a solid-color topcoat film by applying a solid-color topcoat material to the surfacer coat, and
(IV) curing the solid-color topcoat film to give the solid-color topcoat.

A further preferred variant of the process of the invention comprises the steps of:
(I) preparing a basecoat film by applying a basecoat material to the substrate,
(II) drying the basecoat film,
(III) preparing a clearcoat film by applying a clearcoat material to the basecoat film, and
(IV) jointly curing the basecoat film and the clearcoat film to give the basecoat and the clearcoat (wet-on-wet technique).

A third preferred variant of the process of the invention comprises the steps of:
(I) preparing a surfacer film by applying a surfacer to the substrate,
(II) curing the surfacer film to give the surfacer coat,
(III) preparing a basecoat film by applying a basecoat material to the surfacer coat,
(IV) drying the basecoat film,
(V) preparing a clearcoat film by applying a clearcoat material to the basecoat film, and
(VI) jointly curing the basecoat film and the clearcoat film to give the basecoat and the clearcoat (wet-on-wet technique).

Which of the preferred variants is chosen depends on the intended use of the multicoat systems ML of the invention. For instance, the third variant, in particular, is employed with great preference in the context of automotive OEM finishing.

Accordingly, the structure of the multicoat systems ML of the invention may differ.

In a first preferred variant of the multicoat system ML of the invention, the following coats are situated above one another in the stated sequence:
(1) a surfacer coat which absorbs mechanical energy, and
(2) a color and/or effect topcoat.

In a second preferred variant of the multicoat system ML of the invention, the following coats are situated above one another in the stated sequence:
(1) a surfacer coat which absorbs mechanical energy,
(2) a color and/or effect basecoat, and
(3) a clearcoat.

In a third preferred variant of the multicoat system ML of the invention, the following coats are situated above one another in the stated sequence:
(1) a color and/or effect basecoat and
(2) a clearcoat.

The third preferred variant is employed in particular for the coating of plastics.

The application of the coating material of the invention can take place by any customary application method, such as spraying, knife coating, brushing, flow coating, dipping, impregnating, trickling or rolling. The substrate to be coated may itself be at rest, with the application equipment or unit being moved. Alternatively, the substrate to be coated, in particular a coil, may be moved, with the application unit being at rest relative to the substrate or being moved appropriately.

It is preferred to employ spray application methods, such as compressed air spraying, airless spraying, high-speed rotation, electrostatic spray application (ESTA), for example, alone or in conjunction with hot spray application such as hot air spraying, for example. Application may take place at temperatures of max. 70 to 80° C., so that appropriate application viscosities are attained without any change or damage to the coating material and its overspray (which may be intended for reprocessing) during the short period of thermal stress. For instance, hot spraying may be configured in such a way that the coating material is heated only very briefly in the spray nozzle or shortly before the spray nozzle.

The spray booth used for application may, for example, be operated with a circulation system, which may be temperature-controllable, and which is operated with an appropriate absorption medium for the overspray, an example of such medium being the coating material itself.

Where the coating material includes constituents crosslinkable with actinic radiation, application is made under illumination with visible light with a wavelength of above 550 nm, or in the absence of light. By this means, material alteration or damage to the coating material and to the overspray is avoided.

In general, the surfacer film, topcoat film, basecoat film and clearcoat film are applied in a wet film thickness such that their curing gives coats having the film thicknesses which are advantageous and necessary for their functions. In the case of the surfacer this thickness is from 10 to 150, preferably from 15 to 120, with particular preference from 20 to 100, and in particular from 25 to 90 µm, in the case of the topcoat it is from 5 to 90, preferably from 10 to 80, with particular preference from 15 to 60, and in particular from 20 to 50 µm, in the case of the basecoat it is from 5 to 50, preferably from 10 to 40, with particular preference from 12 to 30, and in particular from 15 to 25 µm, and in the case of the clearcoats it is from 10 to 100, preferably from 15 to 80, with particular preference from 20 to 70, and in particular from 25 to 60 μm.

In accordance with the invention, the surfacer, topcoat, basecoat and clearcoat films may be cured thermally, with actinic radiation or both thermally and with actinic radiation, depending on their material composition. Where these films are produced from the inventive coating materials, they are cured thermally or both thermally and with actinic radiation. In accordance with the invention it is of advantage to cure the basecoat film only partly or even not at all before applying a clearcoat film, and then to cure together with the clearcoat film (wet-on-wet technique).

Curing may take place after a certain rest period. This period may have a duration of from 30 s to 2 h, preferably from 1 min to 1 h, and in particular from 1 min to 30 min. The rest period is used, for example, for leveling and devolatilization of the coating films or for the evaporation of volatile constituents such as solvents. The rest period may be shortened and/or assisted by the application of elevated temperatures up to 80° C., provided this does not entail any damage or alteration to the coating films, such as premature complete crosslinking, for instance.

The thermal curing has no special features in terms of its method but instead takes place in accordance with the customary and known methods such as heating in a forced-air oven or irradiation with IR lamps. Thermal curing may also take place in stages. Advantageously, it is effected at a temperature of from 50 to 100° C., with particular preference from 80 to 100° C., and in particular from 90 to 100° C., for a period of from 1 min to 2 h, with particular preference from 2 min to 1 h, and in particular from 3 min to 30 min. Where the substrates used have a high capacity to withstand thermal stress, thermal crosslinking may also be conducted at temperatures above 100° C. In general it is advisable in this case not to exceed temperatures of 180° C., preferably 160° C., and in particular 140° C.

Given an appropriate material composition of the coating material, the thermal curing may be supplemented by curing with actinic radiation, it being possible in particular to use UV radiation and/or electron beams. If desired, it may be supplemented by or conducted with actinic radiation from other radiation sources. In the case of electron beams, it is preferred to operate under an inert gas atmosphere. This may be ensured, for example, by supplying carbon dioxide and/or nitrogen directly to the surface of the coating film.

In the case of curing with UV radiation, as well, it is possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, with or without lead doping in order to open up a radiation window of up to 405 nm, or electron beam sources. The arrangement of these sources is known in principle and may be adapted to the circumstances of the workpiece and the process parameters. In the case of workpieces of complex shape such as automobile bodies, the regions not accessible to direct radiation (shadow regions) such as cavities, folds and other structural undercuts may be cured using pointwise, small-area or all-round emitters, in conjunction with an automatic movement means for the irradiation of cavities or edges.

The equipment and conditions for these curing methods are described, for example, in R. Holmes, "U.V. and E.B. Curing Formulations for Printing Inks", Coatings and Paints, SITA Technology, Academic Press, London, United Kingdom 1984.

Curing may take place in stages, i.e., by multiple exposure to light or actinic radiation. This may also be done alternately, i.e., by curing in alternation with UV radiation and electron beams.

Where thermal curing and curing with actinic radiation are employed together (dual cure), these methods may be used simultaneously or in alternation. Where the two curing methods are used in alternation, it is possible, for example, to begin with thermal curing and end with actinic radiation curing. In other cases it may prove advantageous to begin and to end with actinic radiation curing. The skilled worker is able to determine the curing method particularly appropriate to each individual case on the basis of his or her general knowledge in the art, possibly with the aid of simple preliminary experiments.

The inventive clearcoats have an outstanding profile of properties, particularly a high gloss, high acid resistance, high scratch resistance, and very good leveling. In their utility as refinish coats they adhere excellently to the original finishes, which as a result need no longer, in many cases, be abraided prior to application of the inventive coating materials. A further particular advantage is that it exhibits excellent reflow characteristics even at comparatively low temperatures.

The multicoat systems ML of the invention likewise have an outstanding profile of properties which is very well balanced in terms of mechanical properties, optical properties, corrosion resistance, and adhesion. Thus the multicoat systems ML of the invention have the intercoat adhesion and high optical quality which the market requires and no longer give rise to any problems such as inadequate condensation resistance of the surfacer coats, cracking (mud cracking) in the basecoats, or leveling defects or surface structures in the clearcoats.

In particular, the multicoat system ML of the invention has an outstanding metallic effect, an outstanding D.O.I. (distinctiveness of the reflected image) and outstanding surface smoothness. It is stable to weathering, resistant to chemicals and bird droppings, and scratch-resistant, and exhibits very good reflow characteristics.

A further essential advantage is the very good overcoatability of the inventive multicoat system ML, even without being abraided. As a result, it can easily be coated with customary and known, highly scratch-resistant coating materials based on organically modified ceramic materials.

Not least, however, it proves to be a very particular advantage that by means of the above described processes it is possible to produce a multicoat system ML which is based exclusively on the inventive coating materials.

Accordingly, the inventive substrates also have particular advantages such as a relatively long service life, an improved esthetic impression on the viewer, and an improved technological usefulness, which makes them particularly attractive from an economic standpoint.

EXAMPLES

Preparation Example 1

The Preparation of a Polyaddition Resin (B)

A 4 liter steel reactor was charged with 134 g of trimethylolpropane and 462 g of hexahydrophthalic anhydride and this initial charge was heated at 120° C. for 6.5 hours.

Then 684 g of Versatic® acid glycidyl ester were added and the resulting reaction mixture was heated until an acid number of 4.5 was reached. The polyaddition resin was diluted with butyl acetate, at 90° C., to a solids content of 84.4%. The number-average molecular weight Mn, determined by gel permeation chromatography using polystyrene as internal standard, was 1499 daltons, the mass-average molecular weight Mw was 2485 daltons.

Preparation Example 2

The Preparation of a Composition (A) for Inventive Use

A 4 liter steel reactor with two feed vessels and a reflux condenser was charged with 159 g of 2,5-diethyloctane-1,5-diol, 75 g of VeoVa® 10 (Versatic® acid vinyl ester), 172.5 g of methyl amyl ketone and 132.5 g of ethoxyethyl propionate and this initial charge was heated to 145° C. under nitrogen and with stirring. A mixture of 225 g of styrene, 150 g of tert-butylcyclohexyl acrylate, 300 g of butyl methacrylate, 150 g of isodecyl methacrylate, 199.5 g of hydroxybutyl acrylate and 400.5 g of hydroxypropyl methacrylate, metered in over a period of four hours, and, beginning simultaneously, a mixture of 60 g of di-tert-butyl peroxide and 40 g of methyl amyl ketone, metered in uniformly over a period of five hours, were added to this initial charge at about 145° C. The resulting copolymer was adjusted to a solids content of 70% by weight (one hour, 130° C.) with a mixture of 8 parts by weight of butylacetate, 1 part by weight of xylene and 1 part by weight of methyl amyl ketone, and then had a viscosity of 44 dPas.

Example 1

The Preparation of an Inventive Clearcoat Material and Production of an Inventive Multicoat System ML 1.1 The Inventive Clearcoat Material
The inventive two-component clearcoat material was prepared from the following constituents:
Component 1:
24.6 g of polyaddition resin (B) from Preparation example 1,
19.5 g of the composition (A) from Preparation example 2,
6.9 g of 2,4-diethyloctane-1,5-diol
0.07 g of a 10% strength solution of dibutyltin dilaurate in butyl acetate,
0.07 g of Byk® 331 (commercial leveling additive from Byk Chemie),
0.4 g of a commercial additive which prolongs the potlife,
0.02 g of a commercial, silicone-based leveling additive,
0.8 g of Tinuvin® 400 (commercial light stabilizer from Ciba Specialty Chemical, Inc.), and
0.7 g of Tinuvin® 292 (commercial light stabilizer from Ciba Specialty Chemical, Inc.);
Component 2:
18.5 g of butyl acetate,
22.8 g of Desmodur® 2025 (commercial crosslinking agent from Bayer AG based on hexamethylene diisocyanate), and
6.51 g of Desmodur® 3390 (commercial crosslinking agent from Bayer AG based on hexamethylene diisocyanate).

The inventive two-component clearcoat material had a potlife of two hours.

The original viscosity, measured using the DIN flow cup, was 29 s. The solids content of the clearcoat material was 74% by weight (one hour, 130° C.).

1.2 The Inventive Multicoat System ML

Steel panels with a cathodic coating of a commercial electrocoat material (electrocoat with a film thickness of 18–22 µm) were first coated, using a cup-type gun, with a commercial surfacer from BASF Coatings AG, and baked. This gave a surfacer coat having a film thickness of from 35 to 40 µm. Subsequently, in the same way, a commercial black solid-color basecoat material from BASF Coatings AG was applied to the surfacer and dried at 80° C. for 10 minutes. After the panels had cooled, a film of the inventive two-component clearcoat material was applied, dried at 50° C. for 10 minutes, and then crosslinked at 140° C. for 45 minutes together with the basecoat material. This gave a basecoat film with a thickness of 15 µm and a clearcoat film with a thickness of 44 µm. The black solid-color basecoat material was chosen since it was easiest to observe the formation of scratches on the corresponding test panels.

1.3 Performance Properties of the Inventive Multicoat System ML 1.3.1 Gloss

The gloss was determined by reflectometry in accordance with DIN 67530 at an angle of 20° using a BYK reflectomer, and found to be 83. In this respect, therefore, the inventive multicoat system ML met the requirements of the art.

1.3.2 The Scratch Resistance

The test panels were stored at room temperature for 7 days following application of the coating materials, before testing was carried out.

1.3.2.1 The Scratch Resistance by the Brush Test

The scratch resistance was assessed as follows by means of the BASF brush test described in FIG. 2 on page 28 of the article by P. Betz and A. Bartelt, Progress in Organic Coatings, 22 (1993), pages 27–37, albeit with modification in respect of the weight used (2000 g instead of the 280 g specified therein):

In the test, the film surface was damaged using a woven mesh which was loaded with a weight. The mesh and the film surface were wetted generously with a laundry detergent solution. Using a motor drive, the test panels were moved back and forth in reciprocal movements under the fabric mesh.

The test element was an eraser (4.5×2.0 cm, broad side perpendicular to the direction of scratching) around which was stretched a nylon mesh (No. 11, 31 µm mesh size, Tg 50° C.). The applied weight was 2000 g.

Prior to each test the fabric was replaced, with the running direction of the fabric meshes parallel to the direction of scratching. Using a pipette, about 1 ml of a 0.25% strength Persil solution freshly prepared by stirring was applied in front of the eraser. The rotational speed of the motor was set so as to perform 80 double strokes within a time of 80 s. After the test, the remaining detergent liquid was rinsed off with cold tapwater and the test panels were blown dry using compressed air. The gloss was measured in accordance with DIN 67530 before and after damage and also after regeneration (measurement direction perpendicular to the direction of scratching). The results are given in Table 1.

TABLE 1

The scratch resistance by the brush test

| Gloss: | (%) |
|---|---|
| Before exposure: | 83 |
| After exposure: | 74 |
| After two-hour regeneration at 40° C.: | 82 |
| After two-hour regeneration at 60° C.: | 82 |

The inventive multicoat systems ML were distinguished by very good reflow characteristics even at 40° C.

1.3.2.2 The Scratch Resistance by the Sand Test

The scratch resistance was additionally determined by the sand test, as described, for example, in the German patent application DE-A-198 09 643. For this purpose the film surfaces were loaded with sand (20 g of quartz silver sand, 1.5–2.0 mm). The sand was placed in a beaker (with its base cut off in a planar fashion) which was attached firmly to the test panel. The test panels used were the same as those described above in the brush test. Using a motor drive, the panel was set in shaking movements, with the beaker and the sand. The movement of the loose sand caused damage to the film surface (100 double strokes in 20 s). Following sand exposure, the test area was cleaned to remove abraided material, wiped off carefully under a jet of cold water, and then dried using compressed air. The gloss was measured in accordance with DIN 67530 before and after damage and also regeneration. The results are given in Table 2.

TABLE 2

The scratch resistance by the sand test

| Gloss: | (%) |
|---|---|
| Before exposure: | 83 |
| After exposure: | 55 |
| After two-hour regeneration at 40° C.: | 72 |
| After two-hour regeneration at 60° C.: | 72 |

In this test too, the very good reflow characteristics even at 40° C. were in evidence.

1.3.3 The Adhesion

In the cross hatch test in accordance with DIN 53151 (2 mm) [rating GT0 to GT5; 0=best score; 5=worst score], the inventive multicoat system ML achieved the rating GT0.

The test panels were exposed to the constant condensation conditions (CCC) according to DIN 50017. This exposure did not result in any blisters occuring.

There was also no detrimental effect on the adhesion as a result of the exposure: in the cross hatch test after 240 hours of CCC and 2 hours of regeneration, the inventive multicoat system ML still always achieved the rating GT0.

The invention claimed is:

1. A method for making a solventborne coating material comprising:
I) copolymerizing a mixture of olefinically unsaturated monomers comprising
a1) from 1 to 90% by weight, based on the mixture, of at least one cycloaliphatic monomer and
a2) from 0 to 90% by weight, based on the mixture, of at least one hydroxyl-containing monomer,
the amounts of the olefinically unsaturated monomers adding up to 100% by weight,
in at least one hydroxyl-containing reactive diluent comprising a polyol to form a reaction product; and
II) blending
A) from 5 to 70% by weight, based on the solids content of the coating material, of the reaction product;
B) from 5 to 70% by weight, based on the solids content of the coating material, of at least one hydroxyl-containing polyaddition resin with a number-average molecular weight Mn of from 800 to 3500 and
C) from 5 to 70% by weight, based on the solids content of the coating material, of at least one thermal crosslinking agent;
The amounts of the constituents (A), (B) and (C) adding up to 100% by weight.

2. The method of claim 1, wherein the mixture is copolymerized at a polymerization solid of at least 70% by weight, based on the olefinically unsaturated monomers.

3. The method of claim 1, wherein the reaction product has an OH number of from 100 to 250 mg KOH/g, glass transition temperature of from −25 to +85° C., and a viscosity of <100 dPas in a 70 percent strength solution.

4. The method of claim 1, wherein the cycloaliphatic monomer is at least one of cyclohexyl acrylate, cyclohexyl methacrylate, cyclohexyl ethacrylate, cyciohexyl crotonate, isobornyl acrylate, isobornyl methacrylate, isobornyl ethacrylate, isobornyl crotonate, dicyclopentadienyl acrylate, dicyclopentadienyl methacrylate, dicyclopentadienyl ethacrylate, dicyclopentadienyl crotonate, octahydro-4,7-methano-1H-indenemethanol acrylate, octahydro-4,7-methano-1H-indenemethanol methacrylate, octahydro-4,7-methano-1H-indenemethanol ethacrylate, octahydro-4,7-methano-1H-indenemethanol crotonate, tert-butylcyclohexyl acrylate, tert-butylcyclohexyl methacrylate, tert-butylcyclohexyl ethacrylate, tert-butylcyclohexyl crotonate, 1,4-bis(hydroxymethyl)cyclohexane monoacrylate, 1,4-bis(hydroxymethyl)cyclohexane monomethacrylate, 1,4-bis(hydroxymethyl)cyclohexane monoethyacrylate, 1,4-bis(hydroxymethyl)cyclohexane monocrotonate, octahydro-4,7-methano-1H-indenedimethanol monoacrylate, octahydro-4,7-methano-1H-indenedimethanol monomethacrylate, octahydro-4,7-methano-1H-indenedimethanol monocrotonate.

5. The method of claim 1, wherein the polyols comprise at least one of:
i) hyperbranched compounds containing a tetrafunctional central group that is at least one of i) derived from at least one of ditrimethylololpropane, diglycerol, and ditrimethylolethane, and ii) a tetrafunctional central group of the general formula I

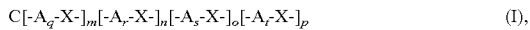

$$C[-A_q-X-]_m[-A_r-X-]_n[-A_s-X-]_o[-A_t-X-]_p \quad (I),$$

wherein:
m+n+o+p=4;
m is an integer from 1 to 3,
n, o, and p are each independently an integer from 0 to 3;
q, r, s, and t are each independently an integer from 1 to 5,
q≧r, q≧s, q≧t;
X is at least one of —O—, —S—, and —NH—;
A is —CR$_2$—;
R is at least one of —H; —F; —Cl; —Br; —CN; —NO$_2$; $C_1$–$C_3$ alkyl; $C_1$–$C_3$ haloalkyl;
$C_1$–$C_3$ alkoxy radical; a $C_2$–$C_4$ alkanediyl radical having 2 to 5 carbon atoms when at least one of q, r, s, and t is at least 2; an oxaalkanediyl radical having 2 to 5 carbon atoms when at least one of q, r, s, and t is at 2; and an oxygen atom —O— which bridges from 3 to 5 carbon atoms of the radical -A- when at least one of q, r, s, and t is at least 2;

ii) branched oligoesters comprising a reaction product of at least one branched polycarboxylic acid with at least one monoepoxy ester, iii) at least one of cyclic $C_9$–$C_{16}$ alkanes and acyclic $C_9$–$C_{16}$ alkanes, wherein the cyclic $C_9$–$C_{16}$ alkanes are functionalized with at lest two hydroxyl groups or at least one hydroxyl group and at least one thiol group; and iv) a hydroformylation product of oligomers of the formula III

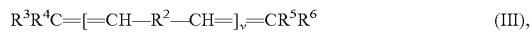

wherein:
$R^2$ is —($CH_2$)$_w$— is an integer from 1 to 6, or $R^2$ is

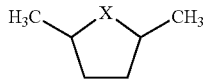

X is —$CH_2$— or an oxygen atom;
$R^3$, $R^4$, $R^5$, and $R^6$ independently of one another are hydrogen atoms or alkyl; and
V is an integer from 1 to 15.

6. The method of claim 1, wherein the polyols are at least one of i) a hyperbranched compound comprising a reaction product of an intermediate with glycidyl esters of tertiary, branched, saturated monocarboxylic acids, wherein the intermediate comprises a reaction product of 2,2-bishydroxymethyl-butane-1,4-diol with a dicarboxylic anhydride, ii) positionally isomeric dialkyloctanediols, and iii) hydroformylated and hydrogenated oligomers prepared by a process comprising:
a) metathesis reacting acyclic monoolefins and cyclic monoolefins to form oligomers,
b) hydroformylating the oligomers, and
c) hydrogenating the oligomers, wherein the cyclic monoolefin comprises cyclopentene and the acyclic monoolefin comprises $C_5$ cut hydrocarbon mixtures obtained in petroleum processing by cracking, wherein the polyols comprising the hydroformylated and hydrogenated oligomers have a hydroxyl number (OHN) from 200 to 650, a number-average molecular weight $M_n$ of from 400 to 1000, a mass-average molecular weight $M_w$ in the range from 600 to 2000, and a polydispersity $M_w/M_n$ of from 1.4 to 3.

7. The method of claim 1, wherein the polyaddition resin is branched and is at least one of an oligoether, an oligoester, and oligocarbonate, an oligourethane, an oligourea, an oligoamide, an oligoimide, and a cooligomer; wherein the cooligomer, in at least one of the oligomer and the oligomer chain, contains at least two groups selected from the group consisting of ether, ester, carbonate, urethane, urea, amide, and imide.

8. The method of claim 7, wherein the polyaddition resin is an oligoadduct that is branched and is at least one of oligomeric oligoesters, oligourethanes, oligoester-cooligoethers, oligoester-co-oligocarbonates oligoester-co-oligourethanes, oligoester-co-oligoamides, oligoester-co-oligoureas and oligoester-co-oligoimides.

9. The method of claim 8, wherein the oligoester comprises at least one of i) a reaction product of at least one branched polycarboxylic acid with at least one monoepoxy ester, and ii) a reaction product of an intermediate with an epoxide, wherein the intermediate is a reaction product of a polyol with a carboxylic anhydride.

10. The method of claim 9, wherein the polyaddition resin comprises a polyol comprising a hyperbranched compounds containing a tetrafunctional central group that is at least one of i) derived from at least one of ditrimethylolpropane, diglycerol, and ditrimethylolethane, and ii) a tetrafunctional central group of the general formula I

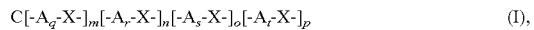

11. The method of claim 1, wherein the coating material is crosslinkable by one of i) thermally or ii) both thermally and with actinic radiation.

* * * * *